US012658110B2

(12) United States Patent
Kim et al.

(10) Patent No.: US 12,658,110 B2

(45) Date of Patent: Jun. 16, 2026

(54) DISPLAY DEVICE

(71) Applicant: Samsung Display Co., Ltd., Yongin-Si (KR)

(72) Inventors: Sung Hwan Kim, Yongin-si (KR); Min Ki Yang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/826,178

(22) Filed: Sep. 6, 2024

(65) Prior Publication Data

US 2025/0157393 A1 May 15, 2025

(30) Foreign Application Priority Data

Nov. 15, 2023 (KR) ........................ 10-2023-0158472
Nov. 16, 2023 (KR) ........................ 10-2023-0159290
Feb. 13, 2024 (KR) ........................ 10-2024-0020514

(51) Int. Cl.
*G09G 3/32* (2016.01)
*G09G 3/3266* (2016.01)

(52) U.S. Cl.
CPC ............. *G09G 3/32* (2013.01); *G09G 3/3266* (2013.01); *G09G 2310/0208* (2013.01); *G09G 2310/0267* (2013.01); *G09G 2310/061* (2013.01); *G09G 2310/08* (2013.01); *G09G 2320/0233* (2013.01)

(58) Field of Classification Search
None
See application file for complete search history.

(56) References Cited

U.S. PATENT DOCUMENTS 8,786,538 B2 7/2014 Byun et al.
12,207,499 B2 1/2025 Kwon et al.
2021/0366397 A1 11/2021 Na
2022/0208088 A1 6/2022 Kim et al.
2023/0154389 A1* 5/2023 Park .......................... G09G 3/32 345/55
2024/0428715 A1* 12/2024 Park .......................... G09G 3/20
2025/0124864 A1* 4/2025 Kim ...................... G09G 3/3266

FOREIGN PATENT DOCUMENTS

EP 4113499 A1 1/2023
KR 10-1392336 B1 5/2014
KR 10-1809285 B1 1/2018
KR 10-2022-0097824 A 7/2022
WO 2011071637 A1 6/2011

* cited by examiner

*Primary Examiner* — Christopher J Kohlman
(74) *Attorney, Agent, or Firm* — Innovation Counsel LLP

(57) ABSTRACT

A display device employs first scan signals having a turn-on level that determines when pixels receive data voltages and second scan signals having a turn-on level that determines times for initializing anode voltages of light emitting elements in the pixels. An active period in a frame period is from a time when the pixels receive an initial first scan signal at the turn-on level to when the pixels receive a last first scan signal of the turn-on level. A blank period in the frame period is from when the pixels receive the last first scan signal at the last turn-on level to when the pixels receive an initial first scan signal of the turn-on level during a next frame period. The blank period is at least as long as a cycle in which each of the pixels receives the second scan signals at the turn-on level.

20 Claims, 23 Drawing Sheets

<ADDRESS SCAN>

<SELF SCAN>

DISPLAY DEVICE

CROSS-REFERENCE TO RELATED APPLICATION

This application claims priority to and the benefit of Korean Patent Application No. 10-2023-0158472 filed in the Korean Intellectual Property Office on Nov. 15, 2023, Korean Patent Application No. 10-2023-0159290 filed in the Korean Intellectual Property Office on Nov. 16, 2023, and Korean Patent Application No. 10-2024-0020514 filed in the Korean Intellectual Property Office on Feb. 13, 2024, the entire contents of which are incorporated herein by reference.

BACKGROUND

1. Field

The present disclosure relates to a display device.

2. Description of the Related Art

Display devices provide a connection medium between users and information and have become increasingly important as information technology has developed. Some examples of display devices currently used include liquid crystal display devices and organic light emitting diode display devices. Such display devices may display an image using a plurality of pixels. These pixels may respectively receive individual voltages that depend on the image being displayed and also receive a common voltage. The load of elements in the pixels that are capacitively coupled to the common voltage may vary over time, which may cause the voltage level of the common voltage to vary. When the voltage level of the common voltage applied to each pixel varies, the luminance of the pixels may be affected, and as a result, image quality may suffer.

SUMMARY

The present disclosure relates to a display device that can maintain uniform display quality.

A display device according to an embodiment of the present disclosure may have pixels including light emitting elements that emit light with luminance based on received data voltages; a first scan driver that provides first scan signals at a turn-on level that determines times at which the pixels receive the data voltages; and a second scan driver that provides second scan signals at a turn-on level that determines times for initializing anode voltages of the light emitting elements, wherein each frame period includes an active period and a blank period, the active period is a period from a time when the pixels receive an initial first scan signal at the turn-on level to a time when the pixels receive a last first scan signal at the turn-on level, the blank period is a period from the time when the pixels receive the last first scan signal at the turn-on level to a time when the pixels receive an initial first scan signal at the turn-on level of a next frame period, and a length of the blank period is larger than or equal to a cycle in which each of the pixels receives the second scan signals at the turn-on level.

The length of the blank period may be an integer times of the cycle in which each pixel receives the second scan signals at the turn-on level.

Each of the pixels may receive the first scan signals at the turn-on level one time during one frame period, each of the pixels may receive the second scan signals at the turn-on level N times during the one frame period, and the N may be an integer greater than 3.

The length of the blank period may be (N−3) times of the cycle in which each of the pixels receives the second scan signals at the turn-on level.

The N may be 4, and the length of the blank period may be one time of the cycle in which each of the pixels receives the second scan signals at the turn-on level.

The N may be 5, and the length of the blank period may be two times of the cycle in which each of the pixels receives second scan signals at the turn-on level.

A number of pixels that simultaneously receive the second scan signals at the turn-on level may maintain the same during the frame periods.

A display device according to an embodiment of the present disclosure may include pixels including light emitting elements that emit light with luminance based on received data voltages; a first scan driver that provides first scan signals at a turn-on level that determines times at which the pixels receive the data voltages; and a second scan driver that provides second scan signals at a turn-on level that determines times for initializing anode voltages of the light emitting elements, wherein each frame period includes an active period and a blank period, the active period is a period from a time when the pixels receive an initial first scan signal at the turn-on level to a time when the pixels receive a last first scan signal at the turn-on level, the blank period is a period from the time when the pixels receive the last first scan signal at the turn-on level to a time when the pixels receive an initial first scan signal at the turn-on level of a next frame period, and a length of the blank period is larger than or equal to half a corresponding frame period.

Each of the frame periods may include, for each of the pixels, one address scan period and one self-scan period, during the address scan period, each of the pixels may receive a first scan signal at the turn-on level and a second scan signal at the turn-on level, and during the self-scan period, each of the pixels may not receive a first scan signal at the turn-on level, and may receive a second scan signal at the turn-on level.

A second scan signal at the turn-on level that pixels in a last pixel row among the pixels receive during the self-scan period may not overlap a first scan signal at the turn-on level that pixels in a first pixel row among the pixels receive during the address scan period.

A display device according to an embodiment of the present disclosure may include pixels including light emitting elements that emit light with luminance based on received data voltages; a first scan driver that provides first scan signals at a turn-on level that determines times at which the pixels receive the data voltages; and a second scan driver that provides second scan signals at a turn-on level that determines times for initializing anode voltages of the light emitting elements, wherein each frame period includes, for each of the pixels, an address scan period and a self-scan period, during the address scan period, each of the pixels receives a first scan signal at the turn-on level and a second scan signal at the turn-on level, and during the self-scan period, each of the pixels does not receive a first scan signal at the turn-on level, and receives a second scan signal at the turn-on level, during each of the frame periods, the self-scan period of a first pixel row starts before the address scan period of a last pixel row ends, and during each of the frame periods, the second scan signals at the turn-on level supplied during the address scan periods of the pixels does not overlap the second scan signals at the turn-on level supplied during the self-scan periods of the pixels.

During each of the frame periods, the second scan signals at the turn-on level supplied during the address scan periods of the pixels may overlap each other in units of M adjacent pixel rows, and M may be an integer greater than 1.

During each of the frame periods, the second scan signals at the turn-on level supplied during self-scan periods of the pixels may overlap each other in units of the M adjacent pixel rows.

A width of the second scan signals at the turn-on level may be P horizontal period, P may be an integer greater than 0, and M may be 2*P.

The P may be 4, and the M may be 8.

The P may be 3, and the M may be 6.

The P may be 2, and the M may be 4.

During each of the frame periods, each of the second scan signals at the turn-on level supplied during the address scan periods of the pixels may include Q pulses, a first pulse among the Q pulses supplied to the first pixel row may overlap R pulses supplied to other pixel rows, and each of Q and R may be an integer greater than 0.

A second pulse among the Q pulses supplied to the first pixel row may overlap S pulses supplied to other pixel rows, and the S may be R+(R+1).

A third pulse among the Q pulses supplied to the first pixel row may overlap T pulses supplied to other pixel rows, and the T may be S+(R+1).

The display device according to some embodiment disclosed herein may maintain uniform display quality.

DETAILED DESCRIPTION OF THE EMBODIMENTS

Figure 1:
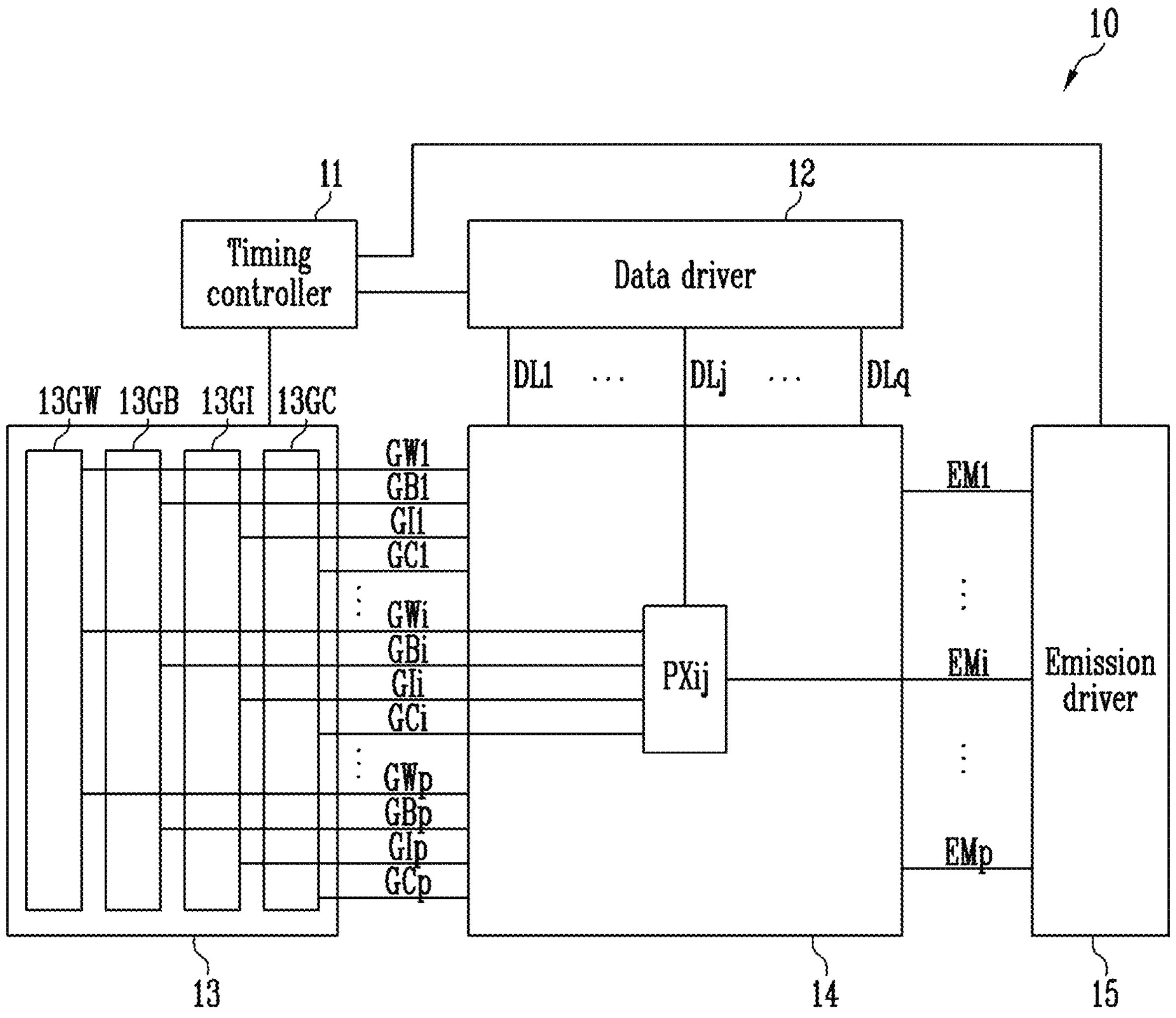
FIG. 1 is a block diagram of a display device according to an embodiment of the present disclosure.

Various embodiments of the present disclosure are described in detail below with reference to the accompanying drawings, so that those skilled in the art can easily carry out the present disclosure. The present disclosure may be embodied in many different forms and is not limited to the embodiments described herein.

In order to clearly illustrate aspects of the present disclosure, elements that are not important to the description may be omitted. The same or similar constituent elements may be referred to using the same reference numerals throughout the specification and drawings.

The size and thickness of elements shown in the drawing may be adapted for better understanding and ease of description or illustration. Accordingly, the present disclosure is not necessarily limited to the dimensions or proportions illustrated in the drawings. In the drawings, the dimensions of layers and regions may be exaggerated for clarity of illustration.

The expression "the same" in the description may mean "substantially the same". That is, elements referred to as being the same may be the same to a degree to which a person with ordinary knowledge would understand as being the same or equivalent. Other expressions may similarly omit "substantially" where one of ordinary skill in art would understand the meaning expressions.

FIG. 1 is a block diagram of a display device 10 according to an embodiment of the present disclosure.

Referring to FIG. 1, the display device 10 may include a timing controller 11, a data driver 12, a scan driver 13, a pixel unit 14, and an emission driver 15.

The timing controller 11 may receive data indicating grayscale values representing an input image (or input frame). The grayscale values for a pixel may include a first color grayscale value, a second color grayscale value, and a third color grayscale value. The first color grayscale value may indicate an intensity for the first color, the second color grayscale value may indicate an intensity for the second color, and the third color grayscale may indicate an intensity for the third color.

The timing controller 11 may additionally receive one or more control signals for the image. These control signals may include a horizontal synchronization signal (Hsync), a vertical synchronization signal (Vsync), and a data enable signal. The vertical synchronization signal may include a plurality of pulses, and the time when each pulse occurs may indicate when one frame period ends and when a new frame period starts. An interval between adjacent pulses in the vertical synchronization signal may correspond to one frame period. The horizontal synchronization signal may include a plurality of pulses, and the time when each pulse occurs may indicate when one horizontal period ends and a new horizontal period starts. An interval between adjacent pulses of the horizontal synchronization signal may correspond to one horizontal period. The data enable signal may have an enable level for certain horizontal periods and a disabled level for other periods. The data enable signal being at the enable level may indicate that color grayscale values are supplied during the corresponding horizontal periods.

The timing controller 11 may provide to the data driver 12 grayscale values rendered or corrected to meet the specifications of the display device 10. Additionally, the timing controller 11 may provide a clock signal, a scan start signal, etc. to the scan driver 13. The timing controller 11 may provide a clock signal, a light emission stop signal, etc. to the emission driver 15.

The data driver 12 may use the grayscales and control signals from the timing controller 11 to generate data voltages to be provided to the data lines DL1, . . . , DLj, . . . , DLq, where q may be an integer greater than 1 and j may be an integer greater than 0 and less than q. For example, the data driver 12 may sample grayscale values using a clock signal and may apply data voltages corresponding to the sampled grayscale values to data lines in units of pixel rows. The scan driver 13 may include first to fourth scan drivers 13GW, 13GB, 13GI, and 13GC. The first scan driver 13GW may provide first scan signals to the first scan lines GW1, . . . , GWi, . . . , and GWp. The second scan driver 13GB may provide second scan signals to the second scan lines GB1, . . . , GBi, . . . , and GBp. The third scan driver 13GI may provide third scan signals to the third scan lines GI1, . . . , GIi, . . . , and GIp. The fourth scan driver 13GC may provide first scan signals to the fourth scan lines GC1, . . . , GCi, . . . , and GCp. Herein, p may be an integer greater than 1, and i may be an integer greater than 0 and less than p.

The first scan driver 13GW, for example, may receive at least one scan clock signal and scan start signal from the timing controller 11 and may generate the first scan signals to be provided to the first scan lines GW1 to GWp. The first scan driver 13GW may sequentially provide the first scan signals having a turn-on level pulse to the first scan lines GW1 to GWp. For example, the first scan driver 13GW may be configured in the form of a shift register and may generate the first scan signals in a manner that sequentially transmits the scan start signal of a turn-on level pulse type to the next scan stage depending on the scan clock signal.

Each of the second scan driver 13GB, the third scan driver 13GI, and the fourth scan driver 13GC may be configured similarly to the first scan driver 13GW, so duplicate descriptions will be omitted. Depending on the embodiment, at least some of the first to fourth scan drivers 13GW, 13GB, 13GI, and 13GC may be integrated or combined. For example, when the polarity and width of the pulses are the same for two or more scan drivers, those scan drivers may be integrated or combined. For example, referring to FIG. 4, which is described further below, since the polarity and width of the turn-on level pulse applied to the third scan line GIi at time t2*a* and the turn-on level pulse applied to the fourth scan line GCi at time t3*a* are the same, the third scan driver 13GI and the fourth scan driver 13GC may be integrated or combined into one driver circuit.

The emission driver 15 may receive at least one light emission clock signal and light emission stop signal from the timing controller 11 and may generate light emission signals to be provided to the light emission lines EM1, . . . , EMi, . . . , and EMp. The emission driver 15 may sequentially provide the light emission signals having a turn-off level pulse to the light emission lines EM1 to EMp. For example, the emission driver 15 may be configured in the form of a shift register and may generate the light emission signals in a manner that sequentially transmits the light emission stop signal, which is a turn-off level pulse type, to the next light emission stage depending on a control of the light emission clock signal.

In the example of FIG. 1, the number of each of the first scan lines GW1 to GWp, the second scan lines GB1 to GBp, the third scan lines GI1 to GIp, the fourth scan lines GC1 to GCp, and the light emission lines EM1 to EMp may be p as shown. However, in an embodiment, the number of at least one of the second scan lines GB1 to GBp, the third scan lines GI1 to GIp, the fourth scan lines GC1 to GCp, and the light emission lines EM1 to EMp may be p/2 or less. For example, two adjacent pixel rows may share one second scan line. Similarly, two adjacent pixel rows may share one third scan line, fourth scan line, or light emission line. The same pixel row refers to pixels connected to the same first scan line.

The pixel unit 14 includes a plurality of pixels. Each pixel PXij may be connected to a corresponding data line DLj, scan lines GWi, GBi, GIi, and GCi, and light emission line EMi. Each pixel PXij may include a light emitting element that emits light based on the received data voltage.

The pixel unit 14 may include first pixels that emit light of a first color, second pixels that emit light of a second color, and third pixels that emit light of a third color. The first color, second color, and third color may be different colors. For example, the first color may be one of red, green, and blue, the second color may be one color other than the first color among red, green, and blue, and the third color may be other color other than the first color and the second color among red, green, and blue. Magenta, cyan, and yellow may be used as the first to third colors instead of red, green, and blue.

The pixel unit 14 may have various layouts such as diamond PENTILE™, RGB-Stripe, S-stripe, Real RGB, normal PENTILE™, and the like.

Figure 2:
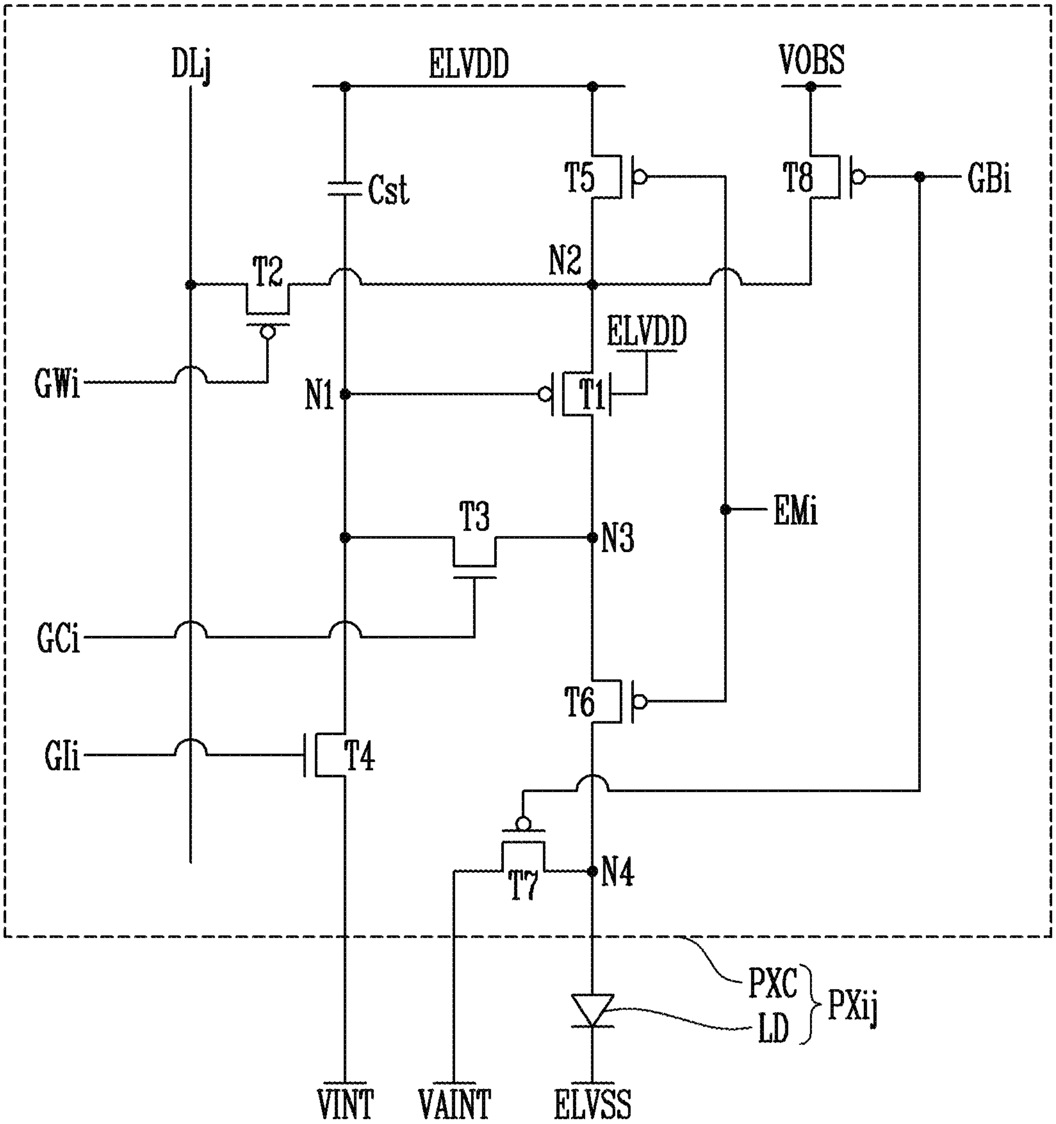
FIG. 2 is a circuit diagram of a pixel according to an embodiment of the present disclosure.

FIG. 2 is a circuit diagram for a pixel according to an embodiment of the present disclosure.

Referring to FIG. 2, the pixel PXij may include a pixel circuit PXC and a light emitting element LD. The pixel circuit PXC may include transistors T1, T2, T3, T4, T5, T6, T7, and T8, and a storage capacitor Cst.

The pixel PXij may be disposed in the i-th pixel row and in the j-th pixel column of a pixel array or unit. The pixel PXij may be a first pixel for expressing the first color. The second pixel for expressing the second color and the third pixel for expressing the third color may include the same circuitry as in the first pixel.

P-type transistors may be polysilicon semiconductor transistors. In a polysilicon semiconductor transistor, the channel of the active layer may include a polysilicon semiconductor. For example, the poly-silicon semiconductor transistor may be a low temperature polysilicon (LTPS) thin film transistor. Polysilicon semiconductor transistors have high electron mobility and thus have fast driving characteristics.

N-type transistors may be oxide semiconductor transistors. In an oxide semiconductor transistor, the channel of the active layer may include an oxide semiconductor. For example, the oxide transistor may be a low temperature polycrystalline oxide (LTPO) thin film transistor. Oxide semiconductor transistors generally have lower charge mobility than do polysilicon semiconductor transistors. Accordingly, the amount of leakage current generated in the turn-off state of oxide semiconductor transistors may be smaller than that of polysilicon semiconductor transistors.

The first transistor T1 may include a gate electrode connected to a first node N1, a first electrode connected to a second node N2, and a second electrode connected to a third node N3. The first transistor T1 may be a driving transistor. The first transistor T1 may be a P-type transistor. According to the embodiment, the first transistor T1 may include a sub-gate electrode (or a back gate electrode or a body electrode), and the sub-gate electrode may receive a first power voltage ELVDD.

The second transistor T2 may have a gate electrode connected to the first scan line GWi, a first electrode connected to the data line DLj, and a second electrode connected to the second node N2. The second transistor T2 may be a switching transistor. The second transistor T2 may be a P-type transistor.

The first scan driver 13GW may provide a first scan signal at a turn-on level that determines when the pixel PXij receives the data voltage. For example, the second transistor T2 may receive the first scan signal at the turn-on level and turned on, causing the second transistor T2 to apply the data voltage from the data line DLj to the second node N2.

The third transistor T3 may have a gate electrode connected to the fourth scan line GCi, a first electrode connected to the first node N1, and a second electrode connected to the third node N3. The third transistor T3 may be a diode-connection transistor that when turned on causes the first transistor T1 to be diode connected. The third transistor T3 may be an N-type transistor.

The fourth transistor T4 has a gate electrode connected to the third scan line GIi, a first electrode connected to the first node N1, and a second electrode receiving a first initialization voltage VINT. The fourth transistor T4 may be a gate initialization transistor. The fourth transistor T4 may be an N-type transistor.

The fifth transistor T5 may have a gate electrode connected to the light emission line EMi, a first electrode receiving the first power voltage ELVDD, and a second electrode connected to the second node N2. The fifth transistor T5 may be a first light emission control transistor. The fifth transistor T5 may be a P-type transistor.

The sixth transistor T6 may have a gate electrode connected to the light emission line EMi, a first electrode connected to the third node N3, and a second electrode connected to the fourth node N4. The sixth transistor T6 may be a second light emission control transistor. The sixth transistor T6 may be a P-type transistor.

The seventh transistor T7 may a gate electrode connected to the second scan line GBi, a first electrode receiving a second initialization voltage VAINT, and a second electrode connected to the fourth node N4. The seventh transistor T7 may be an anode initialization transistor. The seventh transistor T7 may be a P-type transistor.

The second scan driver 13GB may provide a second scan signal at a turn-on level that determines a time for initializing the anode voltage of the light emitting element LD. For example, the seventh transistor T7 may receive the second scan signal at the turn-on level and turned on, causing the second initialization voltage VAINT to be applied to the anode of the light emitting element LD. As a result, the anode voltage of the light emitting element LD may be initialized to the second initialization voltage VAINT.

The eighth transistor T8 may have a gate electrode connected to the second scan line GBi, a first electrode receiving the bias voltage VOBS, and a second electrode connected to the second node N2. The eighth transistor T8 may be a bias transistor. The eighth transistor T8 may be a P-type transistor.

The storage capacitor Cst may have a first electrode receiving the first power voltage ELVDD, and a second electrode connected to the first node N1.

The anode of the light emitting element LD may be connected to the fourth node N4, and the cathode thereof may receive a second power voltage ELVSS. The light emitting element LD may emit light in one of a first color, a second color, and a third color. The light emitting element LD may be a light emitting diode. The light emitting element LD may include an organic light emitting diode, an inorganic light emitting diode, a quantum dot/well light emitting diode, or the like. In an embodiment, each pixel may include only one light emitting element LD, but in some other embodiments, each pixel may include a plurality of light emitting elements. A plurality of light emitting elements in a pixel may be connected in series, parallel, series-parallel, or the like.

Figure 3A:
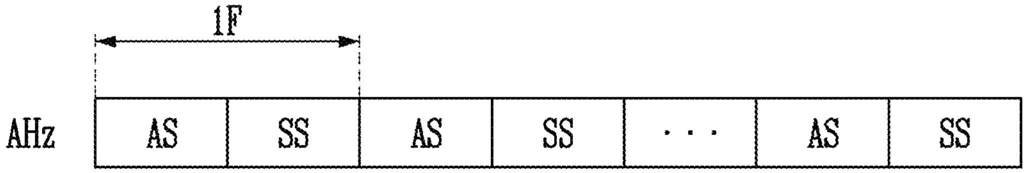
FIGS. 3A and 3B illustrate different display frequencies according to an embodiment of the present disclosure.
Figure 3B:
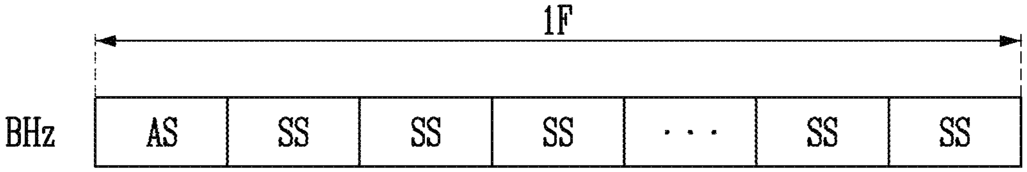

FIGS. 3A and 3B illustrate different display frequencies that a display device according to an embodiment of the present disclosure may support.

The display device 10 may support a variable refresh rate (VRR). A refresh rate may be a frequency at which data voltage is written to each pixel PXij, may be also called screen scan rate or screen refresh rate, and may represent the number of video frames played per second.

The pixel unit 14 of the display device 10, for example, may display an image at a first frequency AHz in the first mode (see FIG. 3A) and may display an image at a second frequency BHz smaller than the first frequency AHz in the second mode (see FIG. 3B). For example, in the first mode, each frame period 1F may include one address scan period AS and one self-scan period SS for each pixel PXij. For example, in the second mode, each frame period 1F may include one address scan period AS and a plurality of self-scan periods SS for each pixel PXij. As the second frequency BHz becomes smaller, the number of self-scan periods SS included in one frame period 1F may increase. In another example, in the third mode, each frame period 1F may include, for each pixel PXij, only one address scan period AS and no self-scan period SS.

The address scan period AS is a period for writing a data voltage to the pixel PXij. The address scan period AS may be referred to as a data programming period for the pixel PXij receiving a data voltage from the data line DLj.

The self-scan period SS is not a period for writing a data voltage to the pixel PXij. During the light emission period of the self-scan period SS, the pixel PXij may emit light using the data voltage written in the prior address scan period AS. The length or duration of the self-scan period SS may be the same as the length or duration of the address scan period AS.

Figure 4:
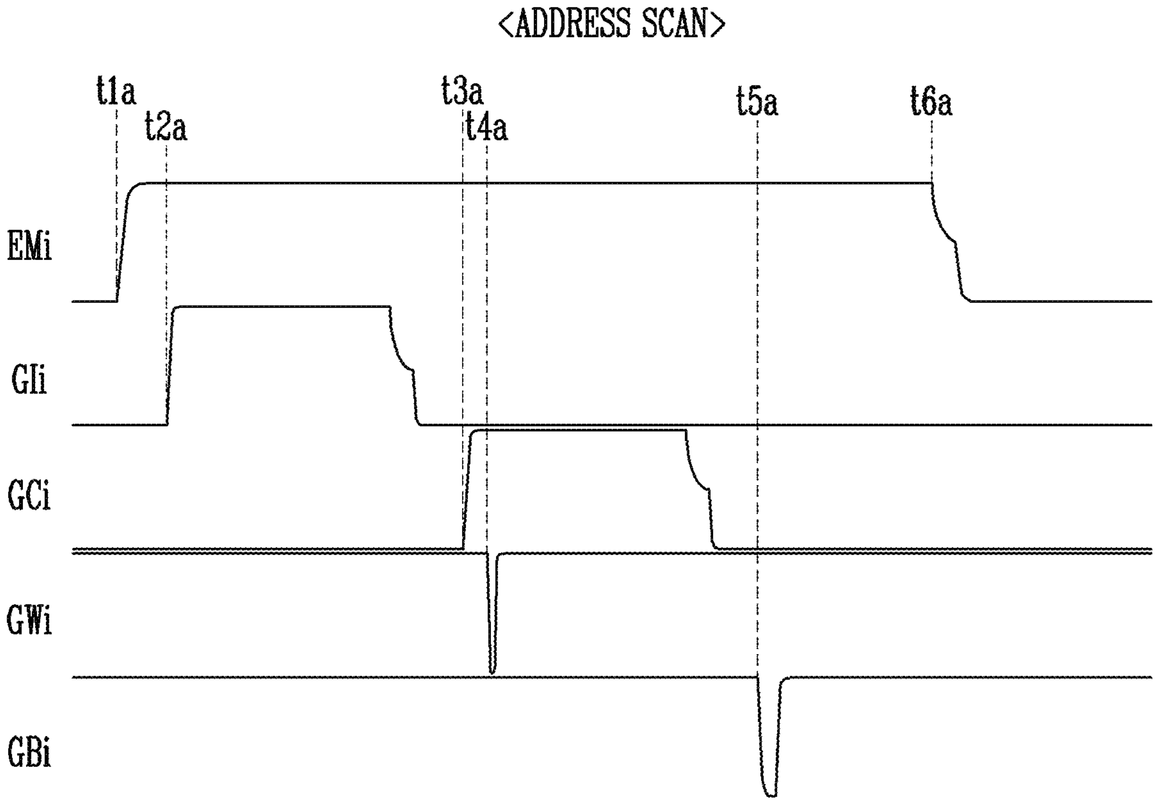
FIG. 4 is a timing diagram illustrating an address scan period according to an embodiment of the present disclosure.

FIG. 4 is a timing diagram illustrating signals applied during an address scan period according to an embodiment of the present disclosure. In describing FIG. 4, the pixel PXij of FIG. 2 is referred to below.

At time t1*a*, the light emission signal at the turn-off level (high level) may be applied to the light emission line EMi, so that the fifth transistor T5 and the sixth transistor T6 may be turned off, and the pixel PXij may be in a non-luminous state.

At time t2*a*, the third scan signal at the turn-on level (high level) may be applied to the third scan line GIi, so that the fourth transistor T4 may be turned on. Accordingly, the first initialization voltage VINT may be applied to the first node N1. The first initialization voltage VINT may be a sufficiently low voltage and may turn on-bias the first transistor T1.

At time t3*a*, the fourth scan signal at the turn-on level (high level) may be applied to the fourth scan line GCi, so that the third transistor T3 may be turned on. Accordingly, the first transistor T1 may be in a diode-connected state in which the drain electrode and the gate electrode of the first transistor T1 are connected.

At time t4*a*, a scan signal at the turn-on level (low level) may be applied to the first scan line GWi, so that the second transistor T2 may be turned on. Accordingly, the data voltage of the data line DLj may be applied to the first node N1 through the second transistor T2, the first transistor T1, and the third transistor T3 that are turned on. At this time, the voltage of the first node N1 may be a compensation voltage obtained by subtracting the threshold voltage of the first transistor T1 from the data voltage. The storage capacitor Cst may maintain the difference between the first power voltage ELVDD and the compensation voltage.

At time t5*a*, a scan signal at the turn-on level (low level) may be applied to the second scan line GBi, so that the seventh transistor T7 and the eighth transistor T8 may be turned on. As the seventh transistor T7 is turned on, the second initialization voltage VAINT may be applied to the anode of the light emitting element LD, and the light emitting element LD may be initialized to the amount of charge corresponding to the voltage difference between the second initialization voltage VAINT and the second power voltage ELVSS. Accordingly, a low grayscale expression of the light emitting element LD may be facilitated.

As the eighth transistor T8 is turned on at time t5*a*, the voltage of the second node N2 may be set to the bias voltage VOBS. Accordingly, since the bias voltage VOBS, rather than the data voltage of the previous frame period, is applied to the source electrode of the first transistor T1, the hysteresis phenomenon may be prevented, and the on-bias state may be guaranteed.

At time t6*a*, the light emission signal at the turn-on level (low level) may be applied to the light emission line EMi, so that the fifth transistor T5 and the sixth transistor T6 may be turned on. Accordingly, a driving current may flow from the first power voltage ELVDD via the fifth transistor T5, the first transistor T1, the sixth transistor T6, and the light emitting element LD to the second power voltage ELVSS. The amount of driving current may depend on the voltage maintained in the storage capacitor Cst. The light emitting element LD may emit light with a luminance corresponding to the amount of driving current. The light emitting element LD may emit light until the light emission signal at the turn-off level is applied to the light emission line EMi.

Figure 5:
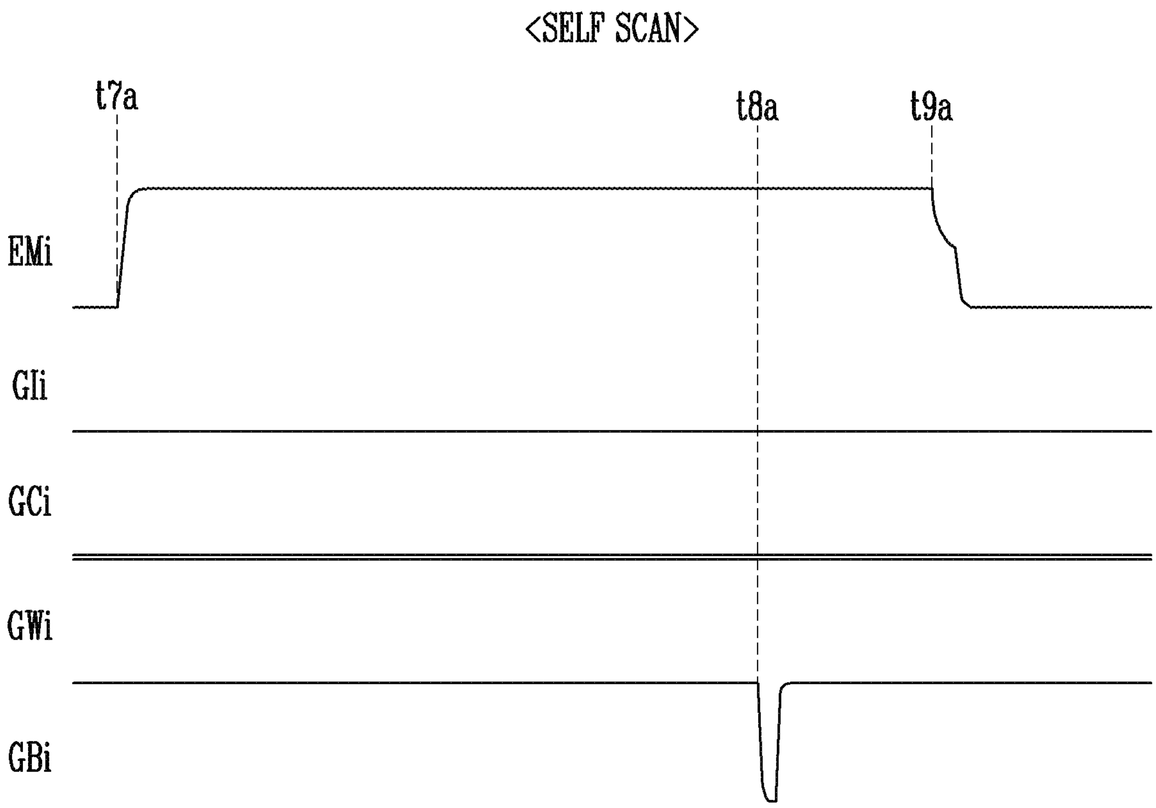
FIG. 5 is a timing diagram illustrating a self-scan period according to an embodiment of the present disclosure.

FIG. 5 is a timing diagram illustrating a self-scan period according to an embodiment of the present disclosure. In describing FIG. 5, the pixel PXij of FIG. 2 is referred to.

At time t7*a*, the light emission signal at the turn-off level (high level) may be applied to the light emission line EMi, so that the fifth transistor T5 and the sixth transistor T6 may be turned off, and the pixel PXij may be in a non-luminous state.

During the period t7*a* to t8*a*, scan signals at the turn-off level may be maintained in the first scan line GWi, the third scan line GIi, and the fourth scan line GCi. Accordingly, the voltage of the first node N1 does not vary.

At time t8*a*, a scan signal at the turn-on level (low level) may be applied to the second scan line GBi, so that the seventh transistor T7 and the eighth transistor T8 may be turned on. As the seventh transistor T7 is turned on, the second initialization voltage VAINT may be applied to the anode of the light emitting element LD, and the light emitting element LD may be initialized to the amount of charge corresponding to the voltage difference between the second initialization voltage VAINT and the second power voltage ELVSS. Accordingly, a low grayscale expression of the light emitting element LD may be facilitated.

As the eighth transistor T8 is turned on, the voltage of the second node N2 may be set to the bias voltage VOBS. Accordingly, since the bias voltage VOBS is applied to the source electrode of the first transistor T1, the hysteresis phenomenon may be prevented, and the on-bias state may be guaranteed.

At time t9*a*, the light emission signal at the turn-on level (low level) may be applied to the light emission line EMi, so that the fifth transistor T5 and the sixth transistor T6 may be turned on. Accordingly, a driving current flows from the first power voltage ELVDD via the fifth transistor T5, the first transistor T1, the sixth transistor T6, and the light emitting element LD to the second power voltage ELVSS. The amount of driving current may depend on the voltage maintained in the storage capacitor Cst. Since the voltage of the first node N1 recorded during the address scan period AS was maintained during the self-scan period SS, the luminance of the pixel PXij in the self-scan period SS may be the same as the luminance of the pixel PXij in the address scan period AS.

Figure 6:
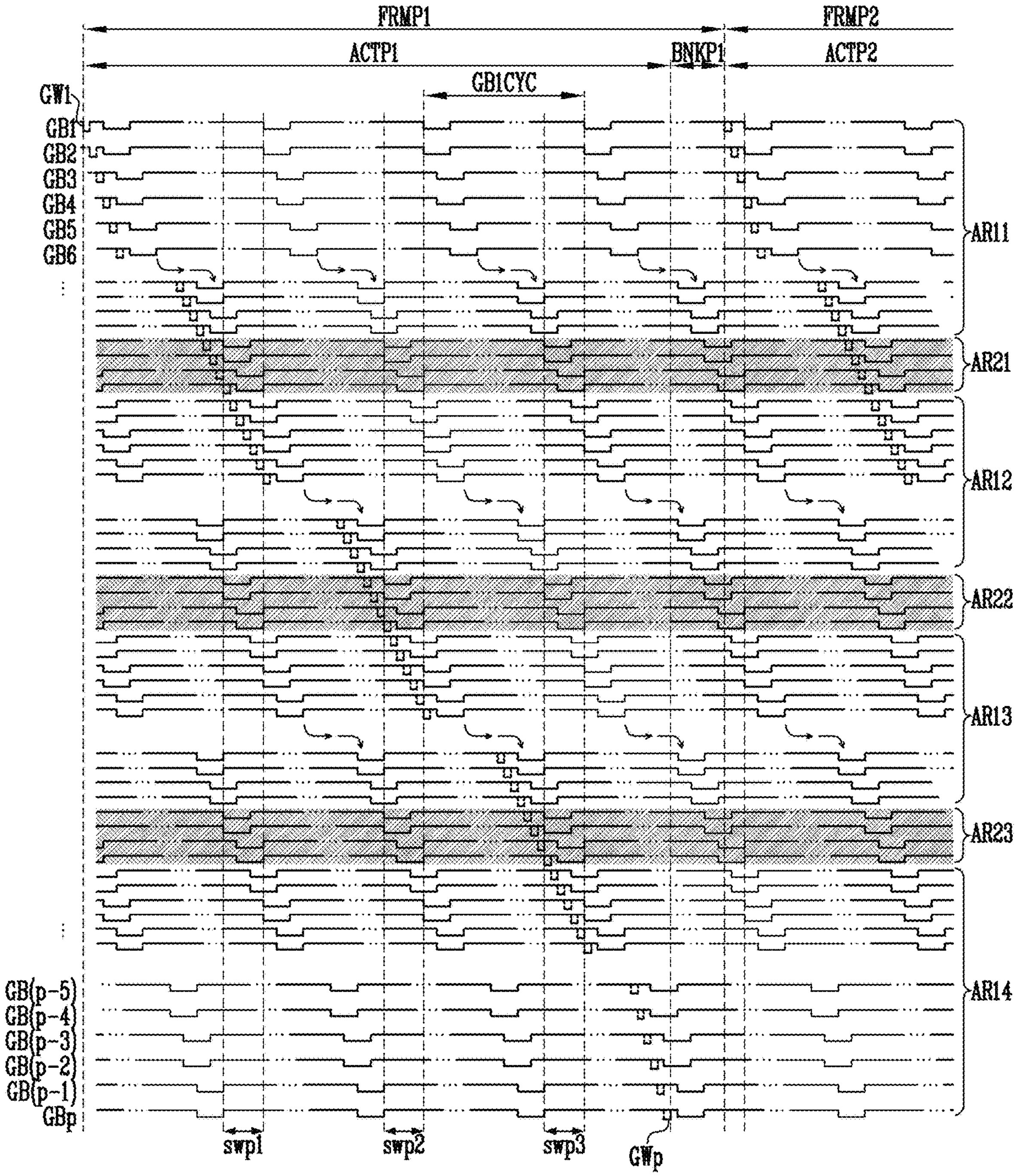
FIG. 6 is a timing diagram illustrating driving of a display device according to an embodiment of the present disclosure.
Figure 7:
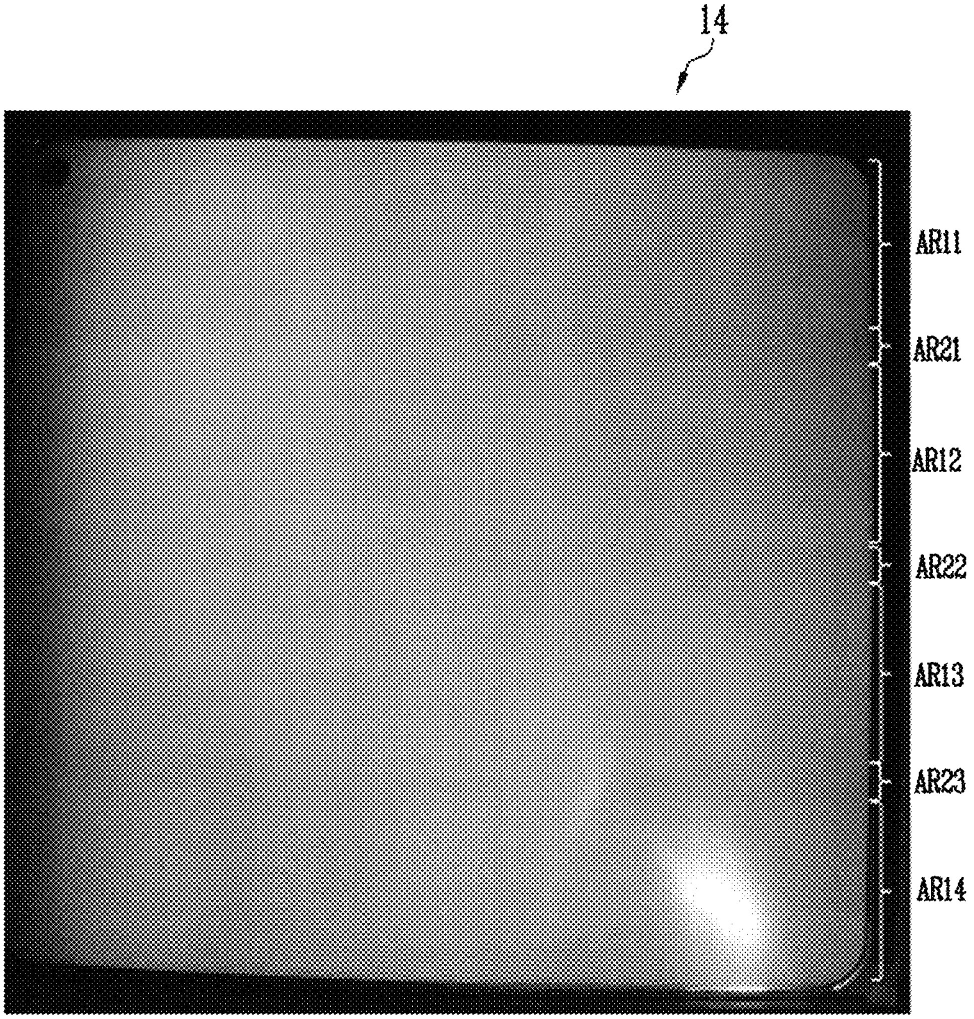
FIG. 7 shows an image displayed using the driving method of FIG. 6.
Figure 8:
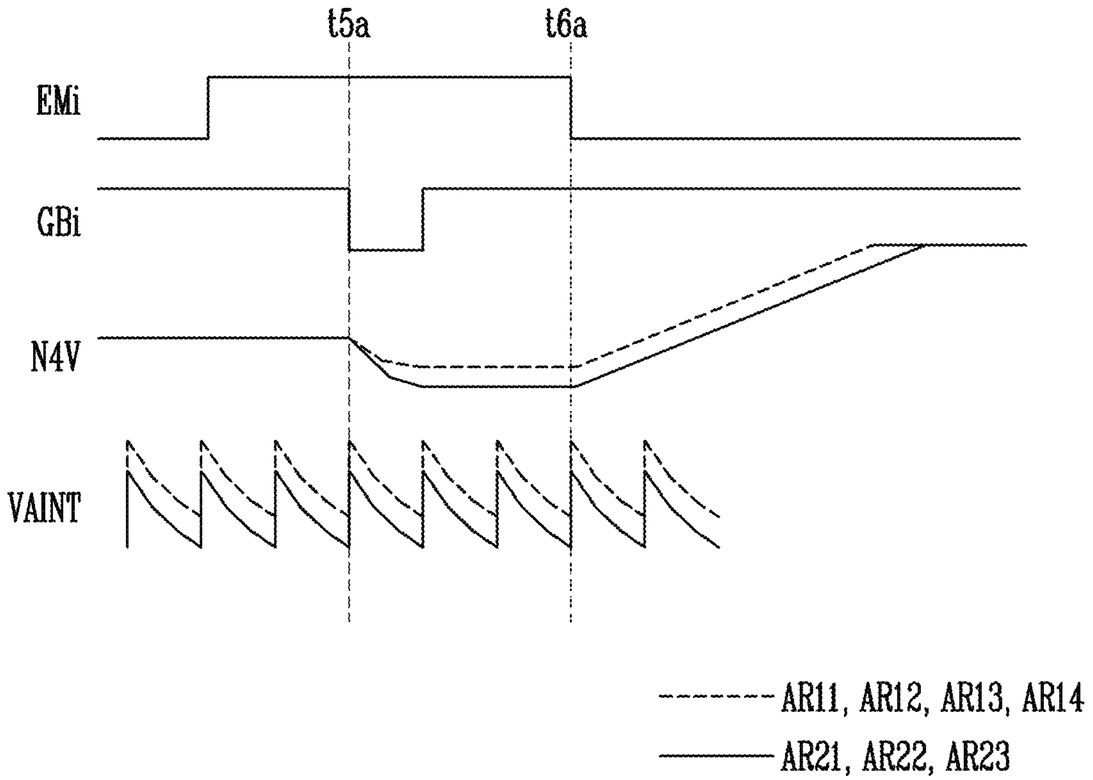
FIG. 8 is a timing diagram for selected signals used during display of the image of FIG. 7.

FIG. 6 is a timing diagram for a driving method of a display device according to an embodiment of the present disclosure. FIG. 7 illustrates an image displayed according to the driving method of FIG. 6, and FIG. 8 is a timing diagram illustrating difference in signals corresponding to variations in the second initialization voltage VAINT.

Referring to FIG. 6, each frame period FRMP1, FRMP2, . . . may include an active period and a blank period. For example, the first frame period FRMP1 may include an active period ACTP1 and a blank period BNKP1. The second frame period FRMP2 may include an active period ACTP2 and a blank period (not shown). The blank period may be a porch period.

The active period ACTP1 or ACTP2 may be a period from a time when the pixels of the pixel unit 14 receive an initial first scan signal at the turn-on level to a time when the pixels of the pixel unit 14 receive a last first scan signal at the turn-on level.

Referring to FIG. 1, the first scan driver 13GW may sequentially apply first scan signals at the turn-on level (low level) to the first scan lines GW1 to GWp. For example, the first scan driver 13GW may apply the initial first scan signal at the turn-on level to the first scan line GW1. For example, the first scan driver 13GW may apply the last first scan signal at the turn-on level to the first scan line GWp. During the active period ACTP1 or ACTP2, at times corresponding to the first scan signals being at the turn-on level, the data driver 12 may apply data voltages to the data lines DL1 to DLq in units of pixel rows.

The blank period BNKP1 as shown in FIG. 6 may be a period from the time when the pixels of the pixel unit 14 receive the last first scan signal at the turn-on level to a time when the pixels of the pixel unit 14 receive an initial first scan signal at the turn-on level of the next frame period FRMP2. During the blank period BNKP1, the data driver 12 may not apply data voltages to the lines DL1 to DLq. Depending on the embodiment, during the blank period BNKP1, the data driver 12 may maintain reference voltages at a specific level in the data lines DL1 to DLq, or the data driver 12 may not supply voltages to the data lines DL1 to DLq.

The second scan driver 13GB may sequentially apply second scan signals at the turn-on level to the second scan lines GB1 to GBp. In the embodiment of FIG. 6, second scan signals at the turn-on level may be sequentially applied in units of two second scan lines. For example, the second scan driver 13GB may include multiple stages, and a first stage of the second scan driver 13GB may simultaneously apply the second scan signal at the turn-on level (low level) to the second scan lines GB1 and GB2. Next, a second stage of the second scan driver 13GB may simultaneously apply the second scan signal at the turn-on level to the second scan lines GB3 and GB4. Next, a third stage of the second scan driver 13GB may simultaneously apply the second scan signal at the turn-on level to the second scan lines GB5 and GB6. In another embodiment, the second scan signals at the turn-on level may be applied sequentially one second scan line (see FIGS. 9 and 10) at a time.

Each pixel may receive the first scan signals at the turn-on level one time (i.e., only once) during one frame period FRMP1. Each pixel may receive its second scan signal at the turn-on level N times during one frame period FRMP1, where N may be an integer greater than 1. In the embodiment of FIG. 6, each pixel is shown as receiving second scan signals at the turn-on level four times during one frame period FRMP1. The second scan driver 13GB may provide second scan signals at the turn-on level to each pixel at a constant rate corresponding to a constant period or cycle GB1CYC. Referring to the description of FIGS. 3A to 5, in the embodiment of FIG. 6, one frame period FRMP1 may include, for each pixel PXij, one address scan period AS and three self-scan periods SS. The address scan periods AS of pixels disposed in the same pixel row may be the same. Likewise, the self-scan periods SS of pixels disposed in the same pixel row may be the same.

FIG. 6 shows an example in which the pulse width of the first scan signal at the turn-on level corresponds to 1 horizontal cycle and the pulse width of the second scan signal at the turn-on level corresponds to 4 horizontal cycles. Also, the time interval between second scan signals at the turn-on level sequentially applied may be 2 horizontal cycles. For example, a time interval of two horizontal periods may pass after the second scan signal at the turn-on level is simultaneously applied to the second scan lines GB1 and GB2, before the second scan signal at the turn-on level may be simultaneously applied to the second scan lines GB3 and GB4. In another embodiment, when the second scan signals at the turn-on level are sequentially applied in units of one second scan line (see FIGS. 9 and 10), the time interval between the second scan signals at the turn-on level sequentially applied may be 1 horizontal period.

In the embodiment of FIG. 6, the length of the blank period BNKP1 may be shorter than the cycle GB1CYC in which each pixel receives the second scan signals at the turn-on level. In this case, the number of second scan lines to which the second scan signals at the turn-on level are applied in each horizontal period of the specific periods swp1, swp2, and swp3 may be 12. Pixels connected to these second scan lines may be disposed in the second areas AR21, AR22, and AR23.

The number of second scan lines to which the second scan signals at the turn-on level are applied in each horizontal period of the remaining periods excluding the specific periods swp1, swp2, and swp3 may be 16 in this example. Pixels connected to these second scan lines may be disposed in the first areas AR11, AR12, AR13, and AR14.

However, during each of the two horizontal periods disposed before/after the specific periods swp1, swp2, and swp3, the number of second scan lines to which the second scan signals at the turn-on level are applied in each horizontal period may be 14 in this example.

Referring to FIG. 7, a photo is shown when a monochromatic image frame is input to the pixel unit 14. Even though the monochromatic image frame is input to the pixel unit 14, darker stripes may be displayed in the second areas AR21, AR22, and AR23 compared to the first areas AR11, AR12, AR13, and AR14.

Referring to FIG. 8, the light emission line EMi, the second scan line GBi, the fourth node voltage N4V, and the second initialization voltage VAINT in the address scan period AS described in FIG. 4 are shown as an example.

At time t5*a*, the second scan signal at the turn-on level may be applied to the second scan line GBi. At this time, the seventh transistor T7 may be turned on, and the second initialization voltage VAINT may be applied to the fourth node N4, which is the anode of the light emitting element LD (see FIG. 2).

The second initialization voltage VAINT may be a common voltage commonly supplied to all pixels of the pixel unit 14. The second initialization voltage VAINT may be supplied as a direct current voltage. However, the voltage level of the second initialization voltage VAINT may vary as a result of being capacitively coupled to different numbers of the anodes of the light emitting elements LD of the plurality of pixels through the plurality of turned-on seventh transistors T7.

As described above, the second initialization voltage VAINT may be capacitively coupled to 16 pixel rows in the first areas AR11, AR12, AR13, and AR14 for one horizontal period. The second initialization voltage VAINT may instead be capacitively coupled to 12 or 14 pixel rows in the second areas AR21, AR22, and AR23 for one horizontal period. Due to this load difference, the voltage level of the second initialization voltage VAINT supplied to the second areas AR21, AR22, and AR23 may be lower than the voltage level of the second initialization voltage VAINT supplied to the first areas AR11, AR12, AR13, and AR14.

Depending on the difference in the voltage level of the second initialization voltage VAINT, a difference also occurs in the fourth node voltage N4V of the fourth node N4. Accordingly, after the time point t6*a*, the light emitting elements LD of the second areas AR21, AR22, and AR23 may emit light with a brightness lower than that of the light emitting elements LD of the first areas AR11, AR12, AR13, and AR14.

FIGS. 9 to 16 are drawings for illustrating a driving method of a display device according to other embodiments of the present disclosure.

Figure 9:
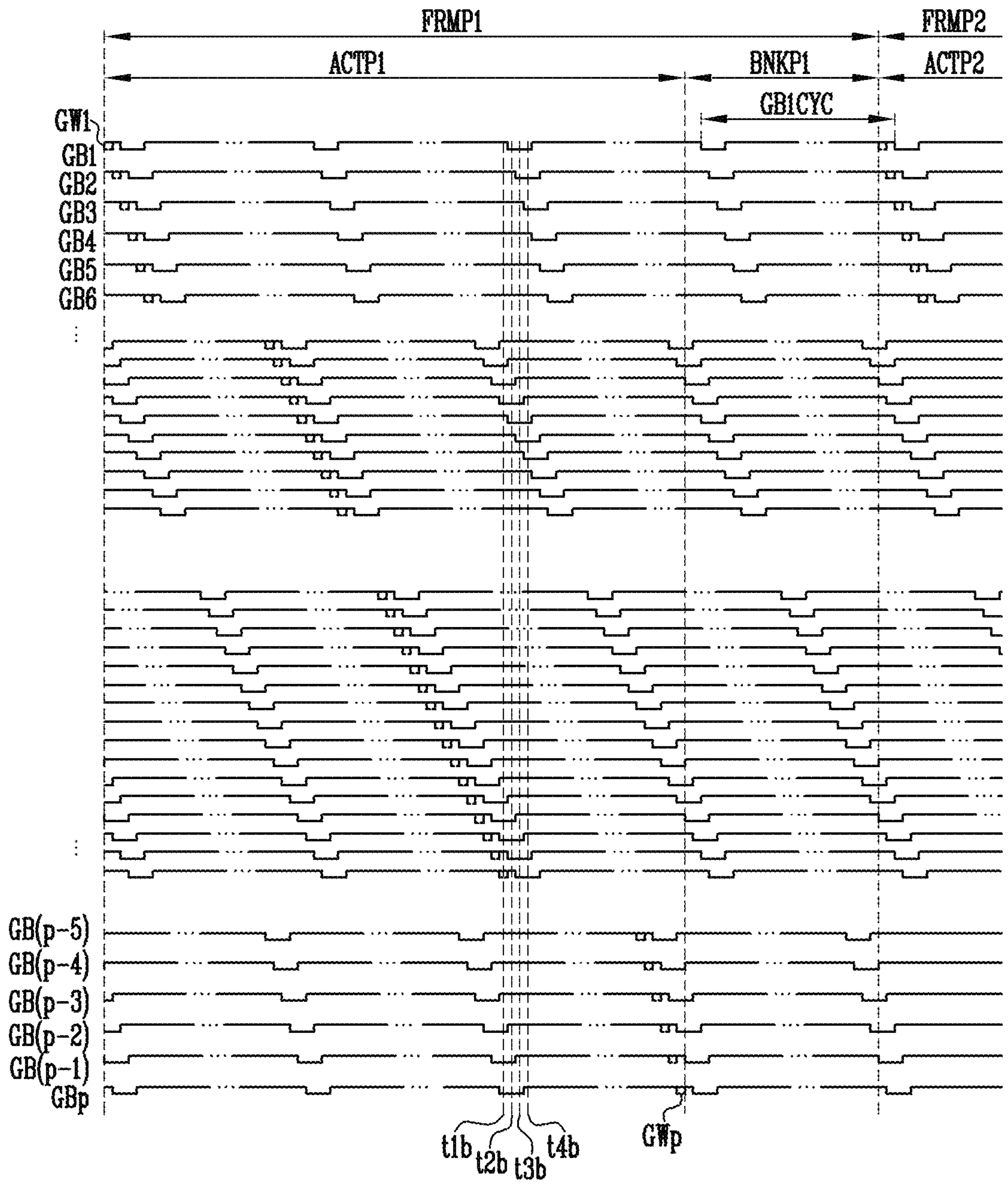
FIGS. 9, 10, 11, 12, 13, 14, 15, and 16 are timing diagrams for display driving methods according to embodiments of the present disclosure.
Figure 10:
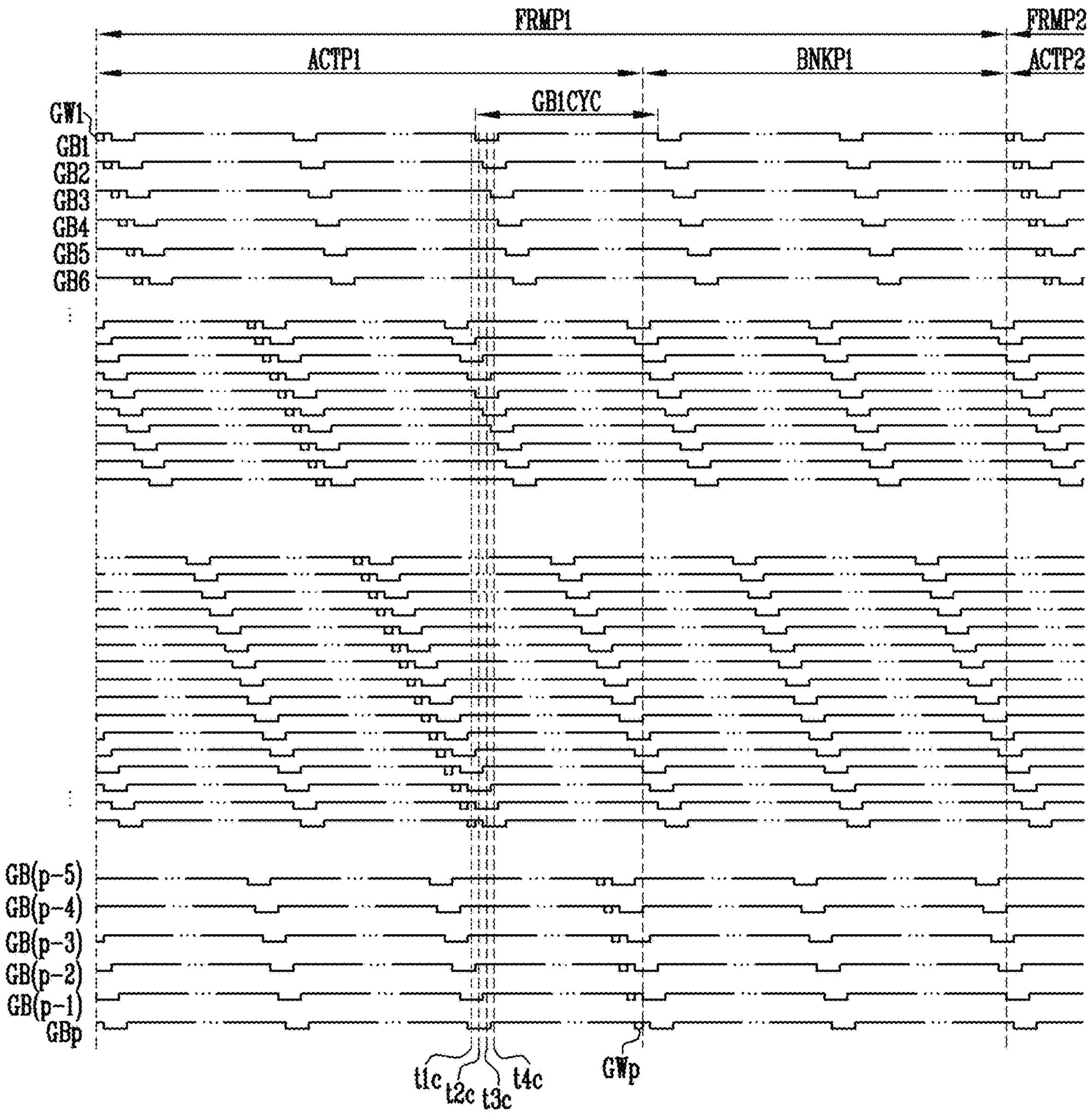

Referring to FIGS. 9 and 10, each frame period FRMP1, FRMP2, . . . may include an active period and a blank period. For example, the first frame period FRMP1 may include an active period ACTP1 and a blank period BNKP1. The second frame period FRMP2 may include an active period ACTP2 and a blank period (not shown).

The active period ACTP1 or ACTP2 may be a period from a time when the pixels of the pixel unit 14 receive an initial first scan signal at the turn-on level to a time when the pixels of the pixel unit 14 receive a last first scan signal at the turn-on level.

The first scan driver 13GW may sequentially apply first scan signals at the turn-on level (low level) to the first scan lines GW1 to GWp. For example, the first scan driver 13GW may apply the initial first scan signal at the turn-on level to the first scan line GW1. For example, the first scan driver 13GW may apply the last first scan signal at the turn-on level to the first scan line GWp. During the active period ACTP1 or ACTP2, at times corresponding to the first scan signals at the turn-on level, the data driver 12 may apply data voltages to the data lines DL1 to DLq in units of pixel rows.

The blank period BNKP1 may be a period from the time when the pixels of the pixel unit 14 receive the last first scan signal at the turn-on level to a time when the pixels of the pixel unit 14 receive an initial first scan signal at the turn-on level of the next frame period FRMP2. During the blank period BNKP1, the data driver 12 may not apply data voltages to the lines DL1 to DLq. Depending on the embodiment, during the blank period BNKP1, the data driver 12 may maintain reference voltages at a specific level in the data lines DL1 to DLq, or the data driver 12 may not supply voltages to the data lines DL1 to DLq.

The second scan driver 13GB may sequentially apply second scan signals at the turn-on level to the second scan lines GB1 to GBp. In the embodiment of FIG. 9, second scan signals at the turn-on level may be sequentially applied in units of one second scan line. For example, the first stage of the second scan driver 13GB may apply the second scan signal at the turn-on level (low level) to the second scan lines GB1. Next, the second stage of the second scan driver 13GB may apply the second scan signal at the turn-on level to the second scan lines GB2. Next, the third stage of the second scan driver 13GB may apply the second scan signal at the turn-on level to the second scan line GB3. In another embodiment, second scan signals at the turn-on level may be sequentially applied in units of two second scan lines (see FIG. 6).

Each pixel may receive the first scan signals at the turn-on level one time during one frame period FRMP1. Each pixel may receive the second scan signals at the turn-on level N times during one frame period FRMP1. N may be an integer greater than or equal to 1. In the embodiment of FIG. 9, each pixel is shown as receiving second scan signals at the turn-on level four times during one frame period FRMP1. In the embodiment of FIG. 10, each pixel is shown as receiving second scan signals at the turn-on level five times during one frame period FRMP1.

The second scan driver 13GB may provide second scan signals at the turn-on level to each pixel at a constant rate corresponding to a constant period or cycle GB1CYC. Referring to the description of FIGS. 3A to 5, in the embodiment of FIG. 9, one frame period FRMP1 may include, for each pixel PXij, one address scan period AS and three self-scan periods SS. In the embodiment of FIG. 10, one frame period FRMP1 may include one address scan period AS and four self-scan periods SS for each pixel PXij. The address scan periods AS of pixels disposed in the same pixel row may be the same. Likewise, the self-scan periods SS of pixels disposed in the same pixel row may be the same.

FIGS. 9 and 10 illustrate examples in which the pulse width of the first scan signal at the turn-on level corresponds to 1 horizontal cycle, and the pulse width of the second scan signal at the turn-on level corresponds to 3 horizontal cycles. Also, the time interval between second scan signals at the turn-on level sequentially applied to sequential scan lines may be one horizontal cycle.

In the embodiments of FIGS. 9 and 10, the length of the blank period BNKP1 may be larger than or equal to the cycle GB1CYC in which each pixel receives the second scan signals at the turn-on level. For example, the length of the blank period BNKP1 may be an integer times of the cycle GB1CYC in which each pixel receives the second scan signals at the turn-on level. For example, the length of the blank period BNKP1 may be (N−3) times the cycle GB1CYC in which each pixel receives the second scan signals at the turn-on level. For example, in the case of FIG. 9, since N corresponds to 4, the length of the blank period BNKP1 may be one times of the cycle GB1CYC in which each pixel receives the second scan signals at the turn-on level. For example, in the case of FIG. 10, since N corresponds to 5, the length of the blank period BNKP1 may be one times of the cycle GB1CYC in which each pixel receives the second scan signals at the turn-on level.

According to the embodiments of FIGS. 9 and 10, the number of pixels that simultaneously receive the second scan signals at the turn-on level may be the same throughout the frame periods FRMP1 and FRMP2. That is, the number of pixels that simultaneously receive the second scan signals at the turn-on level in each horizontal period of the frame periods FRMP1 and FRMP2 may be the same.

FIG. 9 shows an example in which, at successive times t1*b*, t2*b*, t3*b*, and t4*b* corresponding to four successive horizontal periods, the number of pixels that receive the second scan signals at the turn-on level may be the same. For example, at successive times t1*b*, t2*b*, t3*b*, and t4*b*, the number of pixel rows receiving the second scan signals at the turn-on level may be nine, respectively. For example, at time t1*b*, nine pixel rows, including three pixel rows connected to the second scan lines GB(p−2), GB(p−1), and GBp, may receive the second scan signals at the turn-on level. At time t2*b*, nine pixel rows, including three pixel rows connected to the second scan lines GB(p−1), GBp, and GB1, may receive the second scan signals at the turn-on level. At time t3*b*, nine pixel rows, including three pixel rows connected to the second scan lines GBp, GB1, and GB2, may receive second scan signals at the turn-on level. At time t4*b*, nine pixel rows, including three pixel rows connected to the second scan lines GB1, GB2, and GB3, may receive second scan signals at the turn-on level.

FIG. 10 shows an example in which, at successive times t1*c*, t2*c*, t3*c*, and t4*c* corresponding to four successive horizontal periods, the number of pixels that receive the second scan signals at the turn-on level may be the same. For example, at successive time points t1*c*, t2*c*, t3*c*, and t4*c*, the number of pixel rows receiving the second scan signals at the turn-on level may be nine, respectively. For example, at time t1*c*, nine pixel rows, including three pixel rows connected to the second scan lines GB(p−2), GB(p−1), and GBp, may receive the second scan signals at the turn-on level. At time t2*c*, nine pixel rows, including three pixel rows connected to the second scan lines GB(p−1), GBp, and GB1, may receive the second scan signals at the turn-on level. At time t3*c*, nine pixel rows, including three pixel rows connected to the second scan lines GBp, GB1, and GB2, may receive second scan signals at the turn-on level. At time t4*c*, nine pixel rows, including three pixel rows connected to the second scan lines GB1, GB2, and GB3, may receive second scan signals at the turn-on level.

Accordingly, according to the embodiments of FIGS. 9 and 10, variation of the voltage level of the second initialization voltage VAINT due to the load difference does not occur. Accordingly, the display device 10 can maintain uniform display quality without stripes or spots.

Each frame period FRMP1, FRMP2, . . . in FIGS. 11 to 16 may similarly include an active period and a blank period. For example, the first frame period FRMP1 may include an active period ACTP1 and a blank period BNKP1. The second frame period FRMP2 may include an active period ACTP2 and a blank period (not shown).

Figure 14:
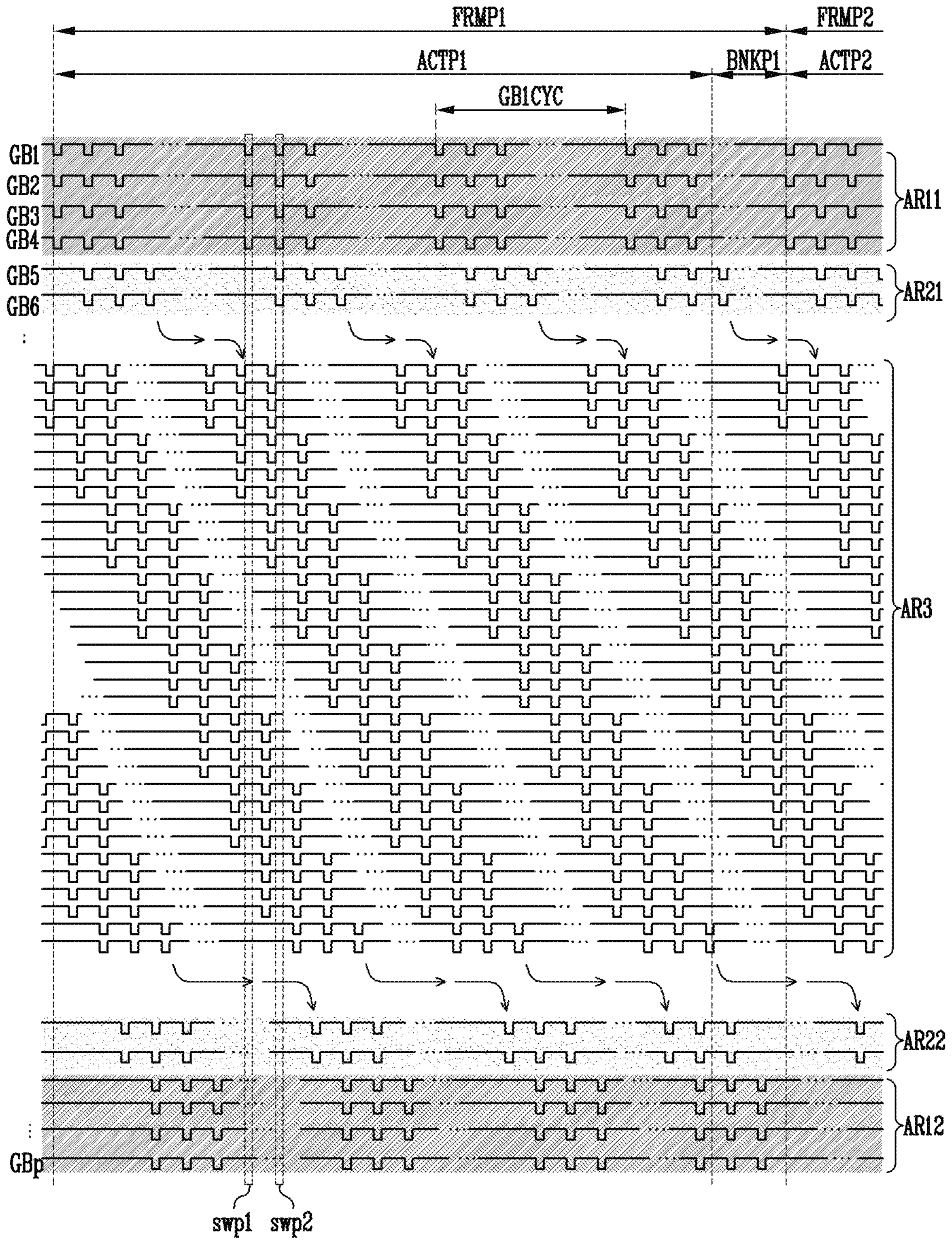
Figure 15:
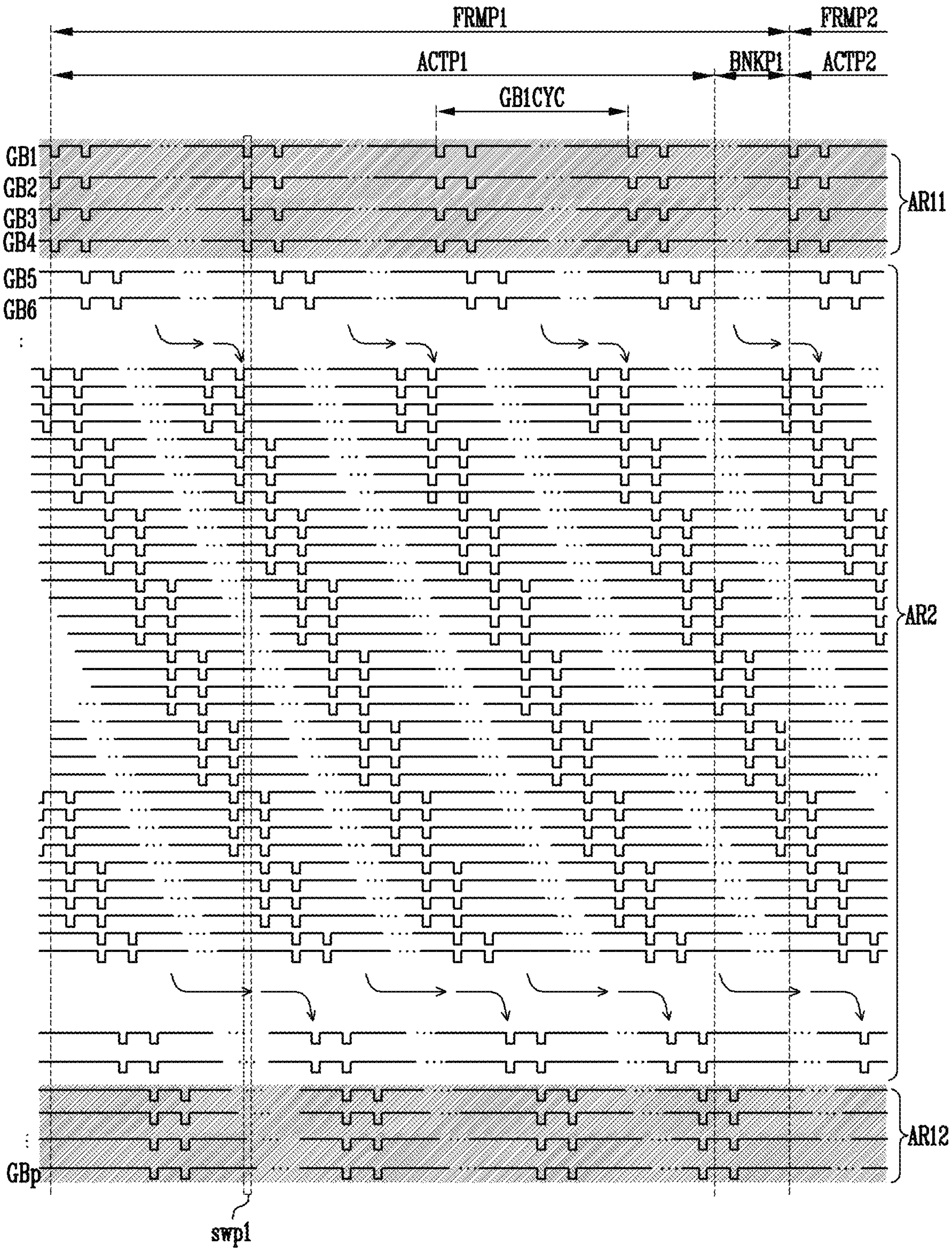
Figure 16:
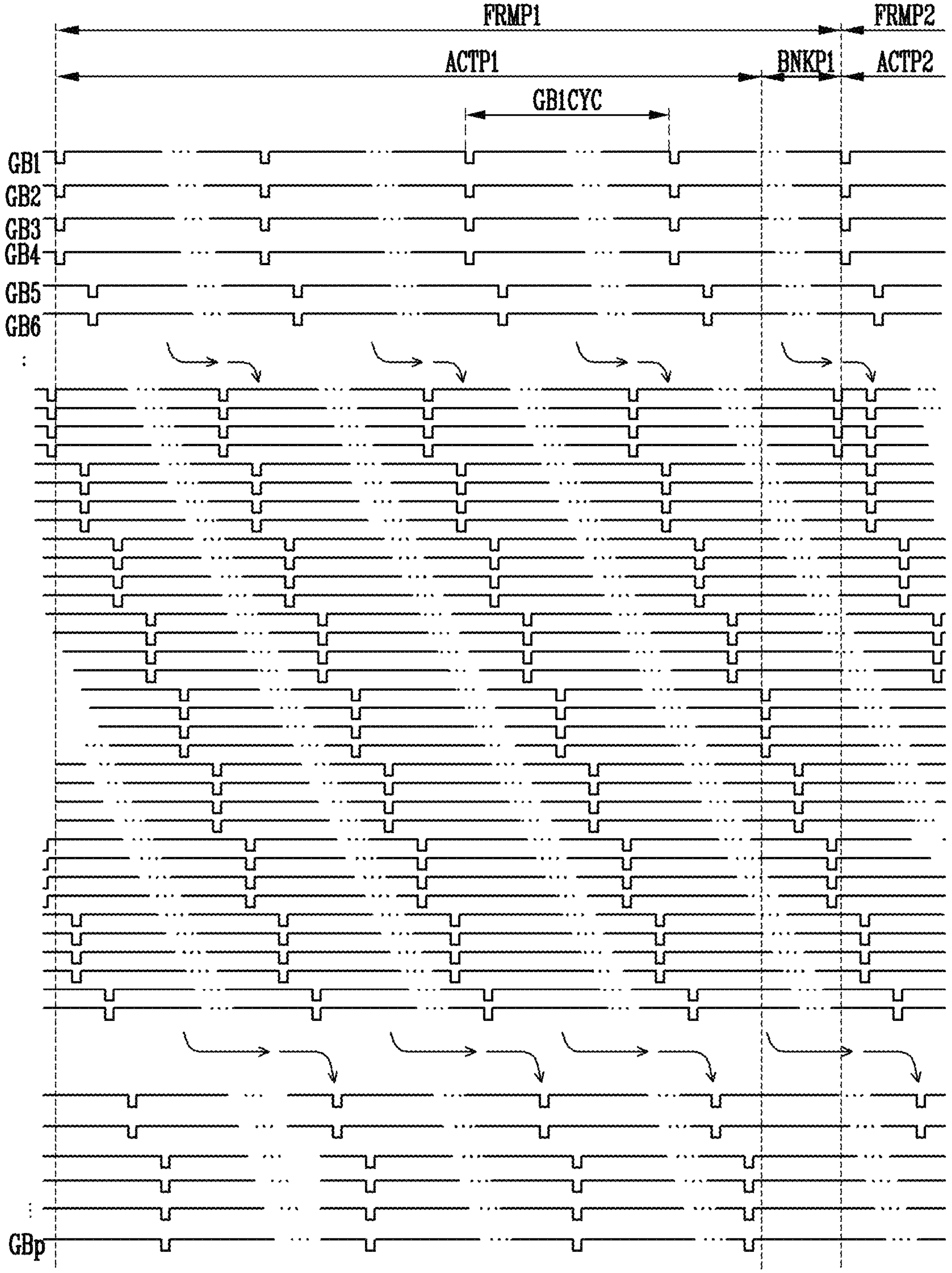

Each frame period FRMP1, FRMP2, . . . may include an address scan period and a self-scan period for each pixel. For example, in the embodiments of FIGS. 11 to 13, each of the frame periods FRMP1, FRMP2, . . . includes, for each pixel, one address scan period and one self-scan period. In the embodiments of FIGS. 14 to 16, each of the frame periods FRMP1, FRMP2, . . . includes, for each pixel, one address scan period and three self-scan periods.

During the address scan period, each pixel may receive the first scan signal at the turn-on level and the second scan signal at the turn-on level. During the self-scan period, each pixel may not receive the first scan signal at the turn-on level but may receive the second scan signal at the turn-on level.

During each frame period FRMP1, FRMP2, . . . , the self-scan period of the first pixel row (i.e., the pixel row connected to the second scan line GB1) may start before the address scan period of the last pixel row (i.e., the pixel row connected to the second scan line GBp) ends. Additionally, during each frame period FRMP1, FRMP2, . . . , the second scan signals at the turn-on level supplied during the address scan periods of the pixels may not overlap the second scan signals at the turn-on level supplied during the self-scan periods of the pixels.

Figure 11:
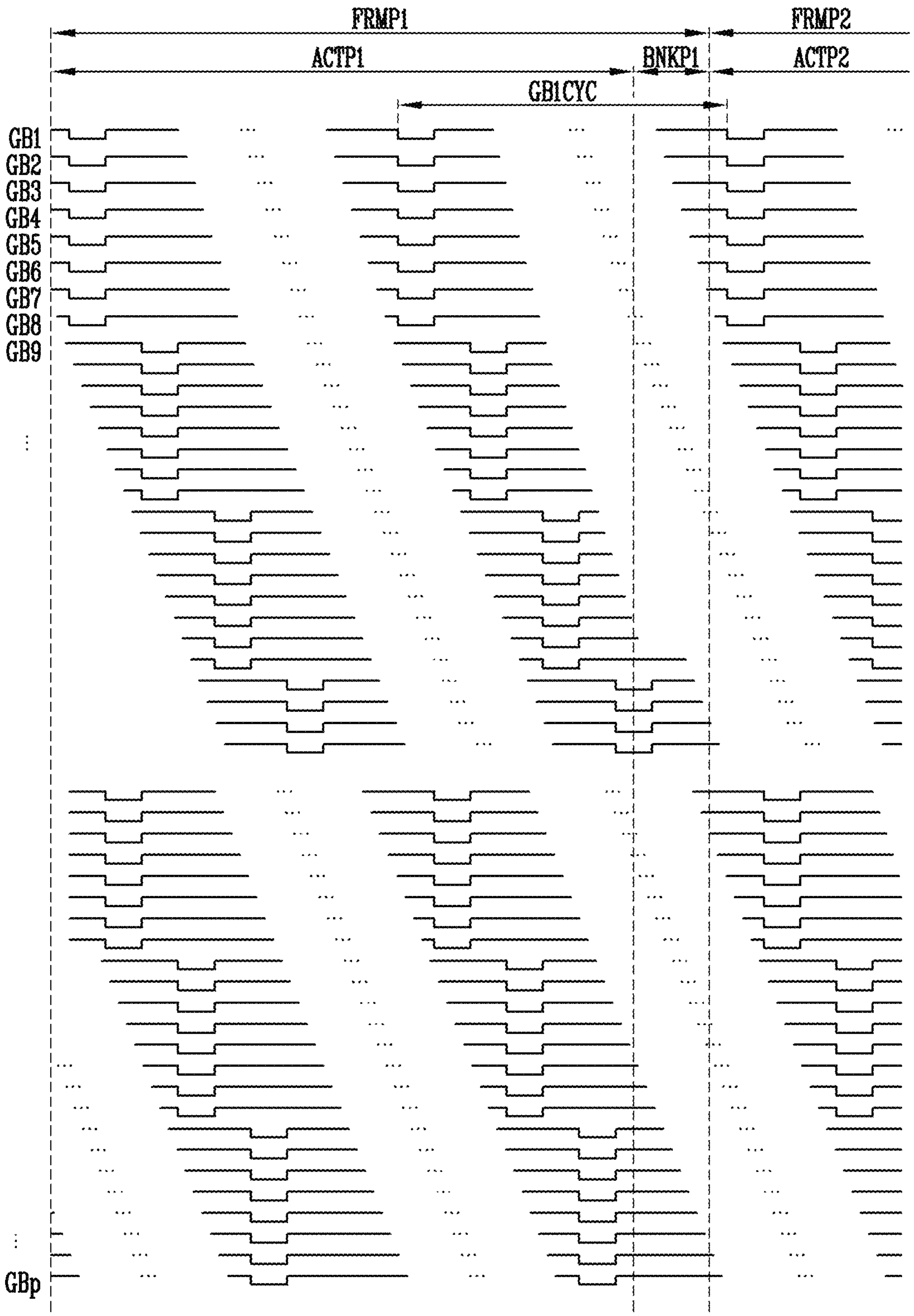
Figure 12:
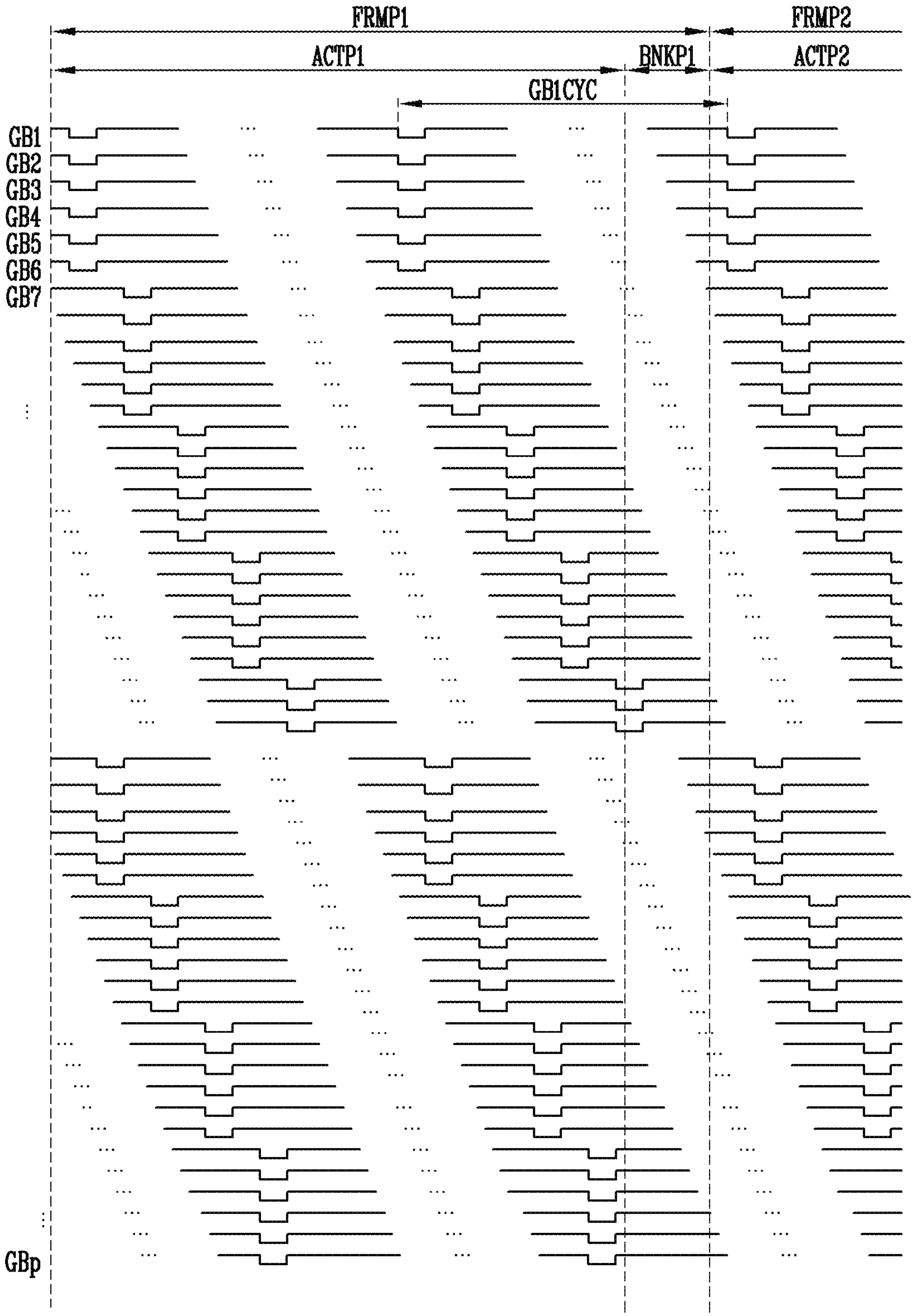
Figure 13:
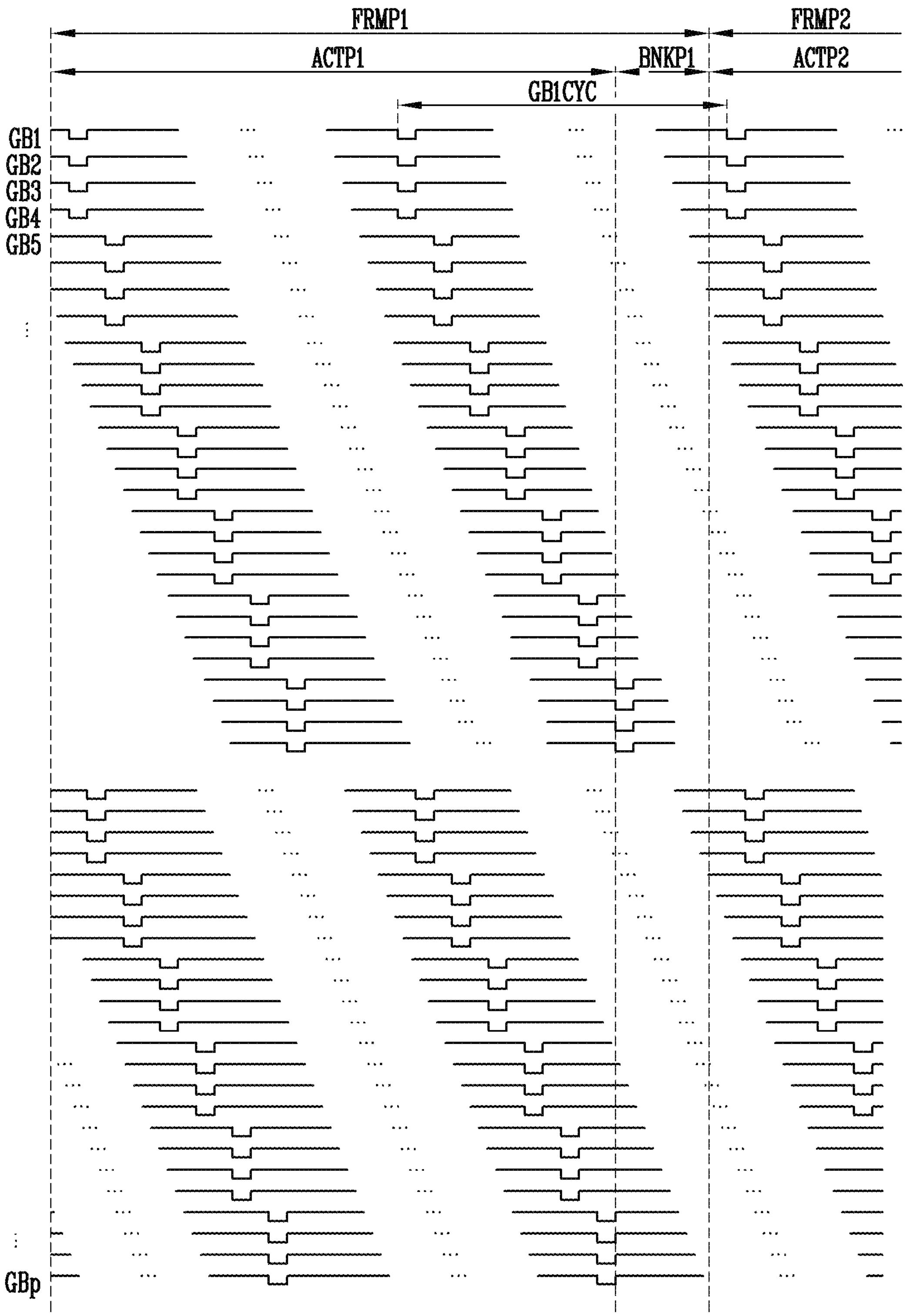

In the embodiments of FIGS. 11 to 13, during each of the frame periods FRMP1, FRMP2, . . . , the second scan signals at the turn-on level supplied during the address scan periods of the pixels may overlap in units of M adjacent pixel rows, where M may be an integer greater than 1. Additionally, during each frame period FRMP1, FRMP2, . . . the second scan signals at the turn-on level supplied during the self-scan periods of the pixels may overlap in units of M adjacent pixel rows.

In one embodiment, the width of the second scan signals at the turn-on level may be P horizontal period. P may be an integer greater than zero. At this time, M may be 2*P. In the case of FIG. 11, P may be 4 and M may be 8. In the case of FIG. 12, P may be 3 and M may be 6. In the case of FIG. 13, P may be 2 and M may be 4.

In each of the embodiments of FIGS. 11 to 13, the number of pixels that simultaneously receive the second scan signals at the turn-on level may remain the same during the frame periods FRMP1 and FRMP2. That is, the number of pixels that simultaneously receive the second scan signals at the turn-on level in each horizontal period of the frame periods FRMP1 and FRMP2 may be the same. In the embodiment of FIG. 11, the number of pixel rows that simultaneously receive the second scan signals at the turn-on level in each horizontal period may be eight. In the embodiment of FIG. 12, the number of pixel rows that simultaneously receive the second scan signals at the turn-on level in each horizontal period may be six. In the embodiment of FIG. 13, the number of pixel rows that simultaneously receive the second scan signals at the turn-on level in each horizontal period may be four. Accordingly, according to the embodiment of FIGS. 11 and 13, variation of the voltage level of the second initialization voltage VAINT due to the load difference does not occur. Accordingly, the display device 10 can maintain uniform display quality without stripes or spots.

In embodiments of FIGS. 14 to 16, during each frame period FRMP1, FRMP2, each of the second scan signals at the turn-on level supplied during the address scan periods of the pixels may include Q pulses. Q may be an integer greater than 0. For example, in FIG. 14, Q may be 3, in FIG. 15, Q may be 2, and in FIG. 16, Q may be 1. Additionally, during each frame period FRMP1 and FRMP2, each of the second scan signals at the turn-on level supplied during the self-scan periods of the pixels may include Q pulses.

The first pulse among the Q pulses supplied to the first pixel row (e.g., pixels connected to the first scan line GW1 and the second scan line GB1) may overlap R pulses supplied to other pixel rows, where R is an integer greater than 1. FIGS. 14, 15, and 16 illustrate examples in which R is 3. Referring to FIGS. 14, 15, and 16, the first pulse among the Q pulses supplied to the second scan line GB1 overlaps pulses supplied to the second scan lines GB2, GB3, and GB4. In the case of FIGS. 14 and 15, four pulses supplied to the second scan lines may overlap each other in the first area AR11 of the pixel unit 14 corresponding to the period swp1. In addition, in the case of FIGS. 14 and 15, four pulses supplied to the second scan lines may overlap each other in the first area AR12 at a position symmetrical to the first area AR11 from the center of the pixel unit 14. In the case of FIG. 16, four pulses supplied to the second scan lines may overlap each other in the entire area of the pixel unit 14.

In addition, the second pulse among the Q pulses supplied to the first pixel row (e.g., pixels connected to the first scan line GW1 and the second scan line GB1) may overlap S pulses supplied to other pixel rows, where S is R+(R+1). For example, S may be 7. FIGS. 14 and 15 illustrate examples in which the second pulse among the Q pulses supplied to the second scan line GB1 overlaps the pulses supplied to the second scan line GB2, GB3, GB4, GB5, GB6, . . . . In the case of FIG. 14, eight pulses supplied to the second scan lines may overlap each other in the second area AR21 of the pixel unit 14 corresponding to the period swp2. In addition, in the case of FIG. 14, eight pulses supplied to the second scan lines may overlap each other in the second area AR22 at a position symmetrical to the second area AR21 from the center of the pixel unit 14. In the case of FIG. 15, in the second area AR2 excluding the first areas AR11 and AR12, eight pulses supplied to the second scan lines may overlap each other.

In addition, the third pulse among the Q pulses supplied to the first pixel row (e.g., pixels connected to the first scan line GW1 and the second scan line GB1) may overlap T pulses supplied to other pixel rows, where T may be S+(R+1). For example, T may be 11. FIG. 14 illustrates and example in which the third pulse among the Q pulses supplied to the second scan line GB1 overlap pulses supplied to the second scan line GB2, GB3, GB4, GB5, GB6, . . . . In the case of FIG. 14, in the third area AR3 excluding the first areas AR11 and AR12 and the second areas AR21 and AR22, 12 pulses supplied to the second scan lines may overlap each other.

FIG. 16 illustrates an example in which the entire area of the pixel unit 14 can show uniform display quality. According to the embodiment of FIG. 15, lower luminance than intended may be exhibited in the start area AR11 and the end area AR12 of the pixel unit 14, but uniform display quality may be displayed in the middle area AR2 of the pixel unit 14. According to the embodiment of FIG. 14, lower luminance than intended may be exhibited in the start areas AR11 and AR21 and the end areas AR12 and AR22 of the pixel unit 14, but uniform display quality may be displayed in the middle area AR3 of the pixel unit 14. In the case of FIGS. 14 and 15, the decrease in luminance of the edge areas AR11, AR12, AR21, and AR22 may not be clearly visible to (and therefore unnoticed by) the user. Additionally, the decrease in luminance of the edge areas AR11, AR12, AR21, and AR22 may be prevented from being visible by covering the edge areas AR11, AR12, AR21, and AR22 with the black matrix. According to the embodiment, the display device 10 may be configured to prevent the decrease in luminance in the edge areas AR11, AR12, AR21, and AR22 by adding dummy pixel rows to the display device 10 before the first pixel row and after the last pixel row.

Figure 17:
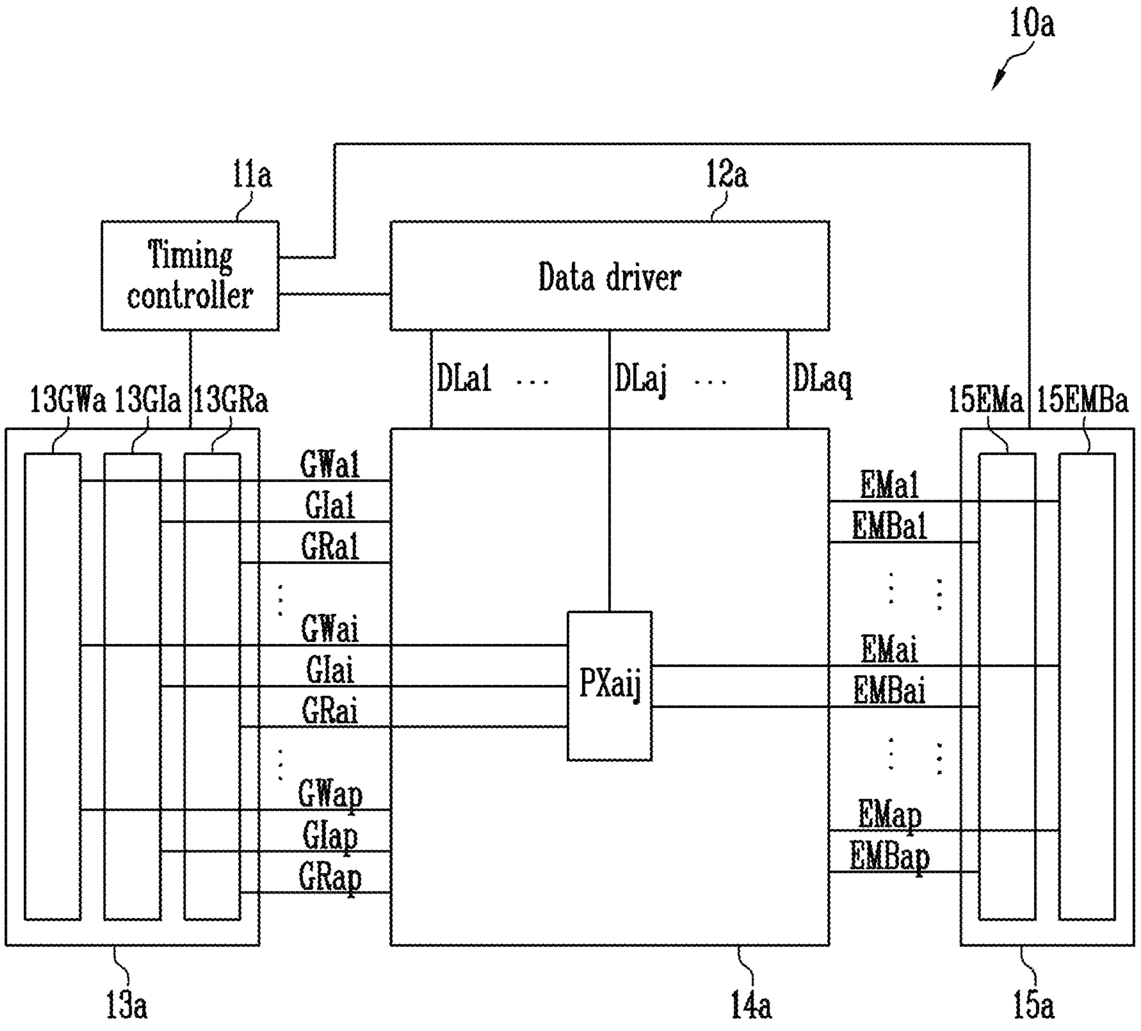
FIG. 17 is a block diagram for a display device according to an embodiment of the present disclosure.

FIG. 17 is a block diagram illustrating a display device 10*a* according to another embodiment of the present disclosure.

Referring to FIG. 17, the display device 10*a* may include a scan driver 13*a* and an emission driver 15*a*. Since other components of the display device 10*a* may be the same as those of the display device 10 of FIG. 1, descriptions of components already described above may be omitted below.

The scan driver 13*a* may include first to third scan drivers 13GWa, 13GIa, and 13GRa. The first scan driver 13GWa may provide first scan signals to the first scan lines GWa1, . . . , GWai, . . . , GWap, where p may be an integer greater than 1 and i may be an integer greater than 0 and less than p. The second scan driver 13GIa may provide second scan signals to the second scan lines GIa1, . . . , GIai, . . . , GIap. The third scan driver 13GRa may provide third scan signals to the third scan lines GRa1, . . . , GRai, . . . , GRap.

The first scan driver 13Gwa may, for example, use at least one scan clock signal and scan start signal from the timing controller 11 to generate first scan signals to be provided to the first scan lines GWa1 to GWap. The first scan driver 13GWa may sequentially provide first scan signals having the turn-on level pulse to the first scan lines GWa1 to GWap. For example, the first scan driver 13GW may be configured in the form of a shift register and may generate the first scan signals in a manner that sequentially transmits the scan start signal, which is a turn-on level pulse type, to the next scan stage depending on a control of the scan clock signal. The second scan driver 13GIa and the third scan driver 13GRa may be configured substantially the same as the first scan driver 13GWa.

The emission driver 15*a* may include a first emission driver 15EMa and a second emission driver 15EMBa. The first emission driver 15EMa may provide first light emission signals to the first light emission lines EMa1, . . . , EMai, . . . , EMap. The second emission driver 15EMBa may provide second light emission signals to the second light emission lines EMBa1, . . . , EMBai, . . . , EMBap.

The first emission driver 15EMa may, for example, use at least one light emission clock signal and light emission stop signal from the timing controller 11 to generate first light emission signals to be provided to the first light emission lines EMa1 to EMap. The first emission driver 15EMa may sequentially provide light emission signals having the turn-off level pulse to the first light emission lines EMa1 to EMap. For example, the first emission driver 15EMa may be configured in the form of a shift register and may generate the first light emission signals in a manner that sequentially transmits the light emission stop signal, which is a turn-off level pulse type, to the next light emission stage depending on a control of the light emission clock signal. The second emission driver 15EMBa may connect to the second light emission lines EMBa1 to EMBap but may otherwise be configured and operate substantially the same as the first emission driver 15EMa.

The pixel unit 14 includes a plurality of pixels PXaij. Each pixel PXija may be connected to the corresponding data line DLaj, the scan lines GWai, GIai, and GRai, and the light emission lines EMai and EMBai. Each pixel PXija may include a light emitting element that emits light based on the data voltage received from the data line DLaj.

Figure 18:
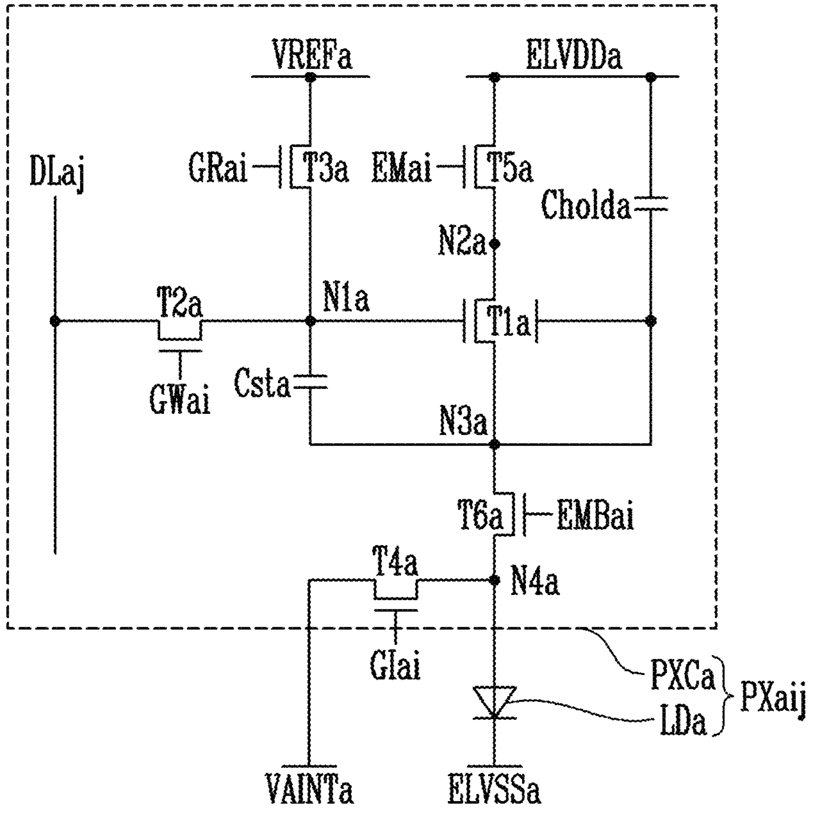
FIG. 18 is a circuit diagram for a pixel according to an embodiment of the present disclosure.

FIG. 18 is a circuit diagram for a pixel PXaij according to an embodiment of the present disclosure.

The pixel PXija according to the embodiment of FIG. 18 may include a pixel circuit PXCa and a light emitting element LDa. The pixel circuit PXCa may include transistors T1*a*, T2*a*, T3*a*, T4*a*, T5*a*, and T6*a*, a first capacitor Csta, and a second capacitor Cholda.

Hereinafter, a pixel circuit PXCa composed of N-type transistors is described as an example. However, a pixel circuit in which any of the N-type transistors is replaced with a P-type transistor may similarly operate by changing a polarity of a voltage applied to a gate terminal of the P-type transistor. Those skilled in the art will be able to design a circuit composed of a combination of a P-type transistor and an N-type transistor. The P-type transistor refers to a transistor in which a current increases when a voltage difference between the gate electrode and the source electrode increases in a negative direction. The N-type transistor refers to a transistor in which a current increases when a voltage difference between the gate electrode and the source electrode increases in a positive direction. Each transistor may be composed of various forms, such as a thin film transistor (TFT), a field effect transistor (FET), a bipolar junction transistor (BJT), and the like.

In an embodiment, the transistors T1*a*, T2*a*, T3*a*, T4*a*, T5*a*, and T6*a* may be N-type oxide thin film transistors. In another embodiment, the transistors T1*a*, T2*a*, T3*a*, T4*a*, T5*a*, and Toa may be P-type silicon thin film transistors. In another embodiment, some of the transistors T1*a*, T2*a*, T3*a*, T4*a*, T5*a*, and Toa may be N-type oxide thin film transistors, and others thereof may be P-type silicon thin film transistors.

The oxide thin film transistor may be a low temperature polycrystalline oxide (LTPO) thin film transistor in which the active pattern (semiconductor layer) includes oxide. However, this is an example, and N-type transistors are not limited thereto. For example, the active pattern (i.e., semiconductor layer) included in the N-type transistor may include an inorganic semiconductor (e.g., amorphous silicon, poly silicon) or an organic semiconductor. The silicon thin film transistor may be a low temperature polysilicon (LTPS) thin film transistor in which the active pattern (semiconductor layer) includes amorphous silicon, poly silicon, etc.

The first transistor T1*a* may have a first gate electrode connected to the first node N1*a* and a second gate electrode connected to the third node N3*a*. The second gate electrode of the first transistor T1*a* may be used to adjust characteristics of the output current compared to the input voltage of the first transistor T1*a*. For example, the first transistor T1*a* may mainly operate in a saturation state. Alternatively, if there is no second gate electrode of the first transistor T1*a*, the magnitude of the output current may vary depending on the change in the drain-source voltage, even though the gate-source voltage is the same. According to this embodiment, the characteristics of the first transistor T1*a* may be adjusted to be insensitive to the change in the drain-source voltage, so that the first transistor T1*a* can output substantially the same current for the same gate-source voltage. The first transistor T1*a* may control the amount of driving current flowing from a first power voltage ELVDDa through the light emitting element LDa to the second power voltage ELVSSa. Accordingly, the first transistor T1*a* may be referred to as a driving transistor. The first electrode of the first transistor T1*a* may be connected to the second node N2*a*, and the second electrode thereof may be connected to the third node N3*a*.

The second transistor T2*a* may have a gate electrode connected to the first scan line GWai, a first electrode connected to the data line DLaj, and a second electrode connected to the first node N1*a*. The second transistor T2*a* may receive the data voltage applied to the data line DLaj. Accordingly, the second transistor T2*a* may be referred to as a data write transistor.

The first scan driver 13GWa may provide the first scan signal at the turn-on level that determines times when the pixel PXija receives the data voltage. For example, the second transistor T2*a*, which receives the first scan signal at the turn-on level, may be turned on, and the second transistor T2*a* may apply the data voltage from the data line DLaj to the first node N1*a*.

The third transistor T3*a* may have a gate electrode connected to the third scan line GRai, a first electrode receiving the reference voltage VREFa, and a second electrode connected to the first node N1*a*. The reference voltage VREFa may be supplied from a reference voltage source. The third transistor T3*a* may apply the reference voltage VREFa to the first node N1*a* to initialize the voltage of the first node Nia as the reference voltage VREFa. Accordingly, the third transistor T3*a* may be referred to as a first initialization transistor.

The fourth transistor T4*a* may have a gate electrode connected to the second scan line GIai, a first electrode receiving the initialization voltage VAINTa, and a second electrode connected to the fourth node N4*a*. The initialization voltage VAINTa may be supplied from an initialization voltage source. The fourth transistor T4*a* may apply the initialization voltage VAINTa to the fourth node N4*a* to initialize the voltage of the fourth node N4*a* as the initialization voltage VAINTa. Accordingly, the fourth transistor T4*a* may be referred to as a second initialization transistor.

The second scan driver 13GIa may provide the second scan signal at the turn-on level that determines times for initializing the anode voltage of the light emitting element LDa. For example, the fourth transistor T4*a*, which receives the second scan signal at the turn-on level, may be turned on, and the initialization voltage VAINTa may be applied to the anode of the light emitting element LDa, so the anode voltage of the light emitting element LD may be initialized to the initialization voltage VAINTa.

The fifth transistor T5*a* may have a gate electrode connected to the first light emission line EMai, a first electrode receiving the first power voltage ELVDDa, and a second electrode connected to the second node N2*a*. The fifth transistor T5*a* may control opening and closing of a driving current to the second node N2*a* along the path from the first power voltage ELVDa to the second power voltage ELVSSa. Accordingly, the fifth transistor T5*a* may be referred to as the first light emission control transistor.

The sixth transistor T6*a* may have a gate electrode connected to the second light emission line EMBai, a first electrode connected to the third node N3*a*, and a second electrode connected to the fourth node N4*a*. The sixth transistor Toa may control opening and closing of the driving current from the third node N3*a* along the path from the first power voltage ELVDa to the second power voltage ELVSSa. Accordingly, the sixth transistor T6*a* may be referred to as a second light emission control transistor.

The first capacitor Csta may connect the first node N1*a* and the third node N3*a*. The first electrode of the second capacitor Cholda may receive the first power voltage ELVDDa, and the second electrode thereof may be connected to the third node N3*a*.

The anode of the light emitting element LDa may be connected to the fourth node N4*a*, and the cathode thereof may receive the second power voltage ELVSSa. The light emitting element LDa may be a light emitting diode. The light emitting element LDa may include an organic light emitting diode, an inorganic light emitting diode, a quantum dot/well light emitting diode, or the like. In this embodiment, each pixel may include only one light emitting element LDa, but in other embodiments, each pixel may include a plurality of light emitting elements. The plurality of light emitting elements may be connected in series, parallel, series-parallel, or the like. The light emitting element LDa of each pixel PXaij may emit light with one of a first color, a second color, and a third color.

Figure 19:
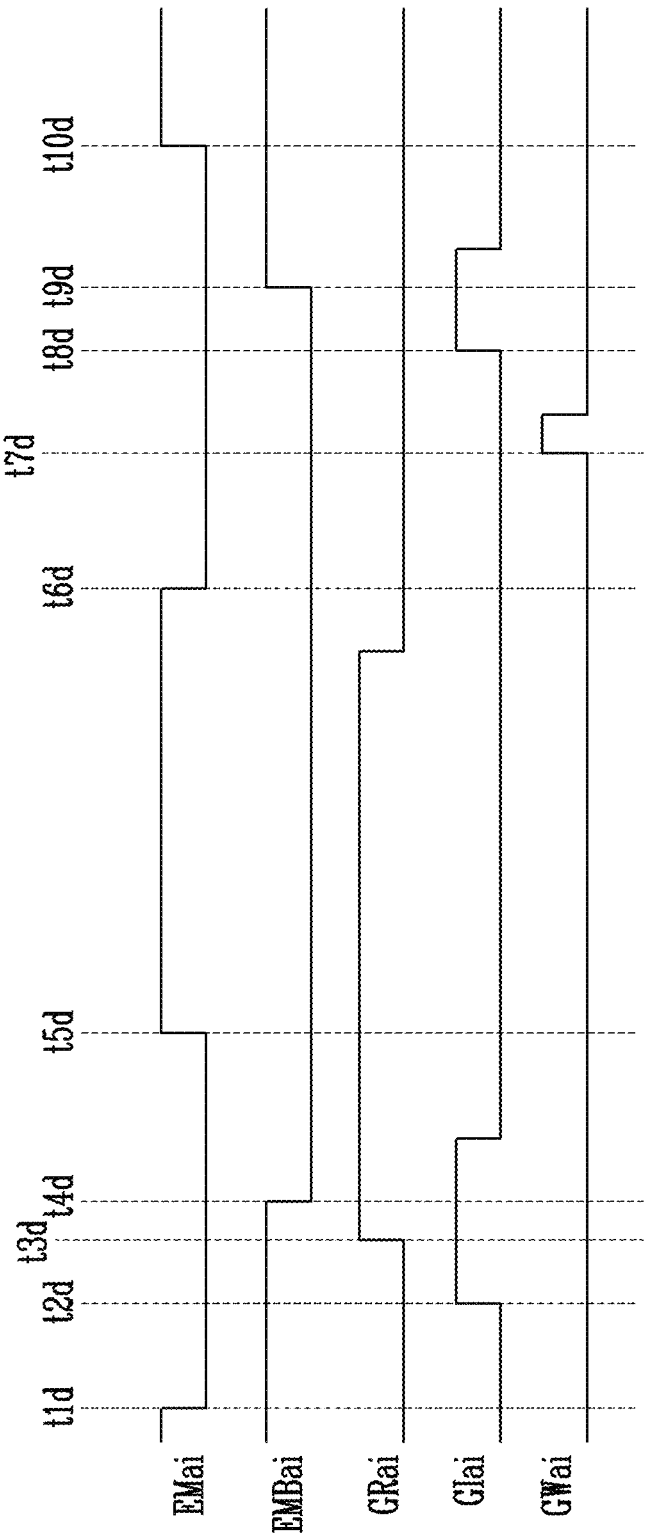
FIG. 19 is a timing diagram for an address scan period according to an embodiment of the present disclosure.

FIG. 19 is a timing diagram illustrating an address scan period according to an embodiment of the present disclosure.

The address scan period in FIG. 19 is an example of the address scan period AS in FIGS. 3A and 3B. Hereinafter, the description will be based on the pixel rows connected to the i-th scan lines GWai, GIai, and GRai and the i-th light emission lines EMai and EMBai as shown in FIGS. 17 and 18.

First, at time t1*d*, the first light emission signal at a turn-off level (e.g., low level) may be applied to the first light emission line EMai. Accordingly, the fifth transistor T5*a* may be turned off, and the light emission period based on the data voltage written in the previous frame period may end.

Next, at time t2*d*, the second scan signal at the turn-on level (e.g., high level) may be applied to the second scan line GIai, so that the fourth transistor T4*a* can be turned on. Accordingly, the initialization voltage VAINTa may be applied to the fourth node N4*a*. Accordingly, the anode voltage of the light emitting element LDa may be initialized. At this time, since the sixth transistor T6*a* is turned on, the initialization voltage VAINTa may also be applied to the third node N3*a*. Accordingly, the voltage of the second electrode of the second capacitor Cholda may be initialized.

Next, the third scan signal at the turn-on level may be applied to the third scan line GRai at time t3*d*, so that the third transistor T3*a* can be turned on. Accordingly, the reference voltage VREFa may be applied to the first node N1*a*, and the voltages of both ends of the first capacitor Csta may be initialized.

Next, the second light emission signal at the turn-off level may be applied to the second light emission line EMBai at time t4*d*, so that the sixth transistor T6*a* can be turned off. Accordingly, the third node N3*a* and the fourth node N4*a* may be electrically separated.

Next, the first light emission signal at the turn-on level may be applied to the first light emission line EMai at time t5*d*, so that the fifth transistor T5*a* can be turned on. As described above, the voltages of both ends of the first capacitor Csta have been initialized, and at time t5*d*, the first capacitor Csta may maintain the voltage difference between the gate electrode (first node N1*a*) and the source electrode (third node N3*a*) of the first transistor T1*a* higher than the threshold voltage of the first transistor T1*a*. Accordingly, at time t5*d*, the first transistor T1*a* may be turned on. At this time, since current is supplied from the first power voltage ELVDa through the turned-on fifth transistor T5*a* and the first transistor T1*a*, the voltage of the third node N3*a* may gradually increase. When the voltage difference between the gate electrode (first node N1*a*) and the source electrode (third node N3*a*) of the first transistor T1*a* reaches the threshold voltage of the first transistor T1*a*, the first transistor T1*a*) may turn off, and the voltage of the third node N3*a* may be maintained. Accordingly, the first capacitor Csta may store a voltage corresponding to the threshold voltage of the first transistor T1*a*. The period during which the voltage corresponding to the threshold voltage of the first transistor T1*a* is stored in the first capacitor Csta may be referred to as a compensation period. At time t6*d*, when the first light emission signal at the turn-off level is supplied to the first light emission line EMai, the compensation period may end.

Next, the first scan signal at the turn-on level is applied to the first scan line GWai at time t7*d*, so that the second transistor T2*a* can be turned on. At this time, the data voltage on the data line DLaj may be written to the first node N1*a*. The voltage of the third node N3*a* may vary depending on the capacitance ratio of the capacitors Csta and Cholda and the voltage of the third node N3*a* previously stored during the compensation period.

Next, the second scan signal at the turn-on level is applied to the second scan line GIai at time t8*d*, so that the fourth transistor T4*a* can be turned on. Therefore, the anode voltage of the light emitting element LDa is initialized to the initialization voltage VAINTa, so that the light emitting element LDa can effectively express low grayscale levels such as black grayscales.

Next, at time t9*d*, the second light emission signal at the turn-on level is applied to the second light emission line EMBai, so that the sixth transistor T6*a* can be turned on. Accordingly, the first transistor T1*a* may be connected to the anode of the light emitting element LDa.

Next, at time t10*d*, the first light emission signal at the turn-on level is applied to the first light emission line EMai, so that the fifth transistor T5*a* can be turned on. Accordingly, a driving current path connected to the first power voltage ELVDDa, the fifth transistor T5*a*, the first transistor T1*a*, the sixth transistor T6*a*, and the second power voltage ELVSSa may be created, and the light emitting element LDa may emit light with a luminance corresponding to the amount of driving current flowing along the driving current path.

Figure 20:
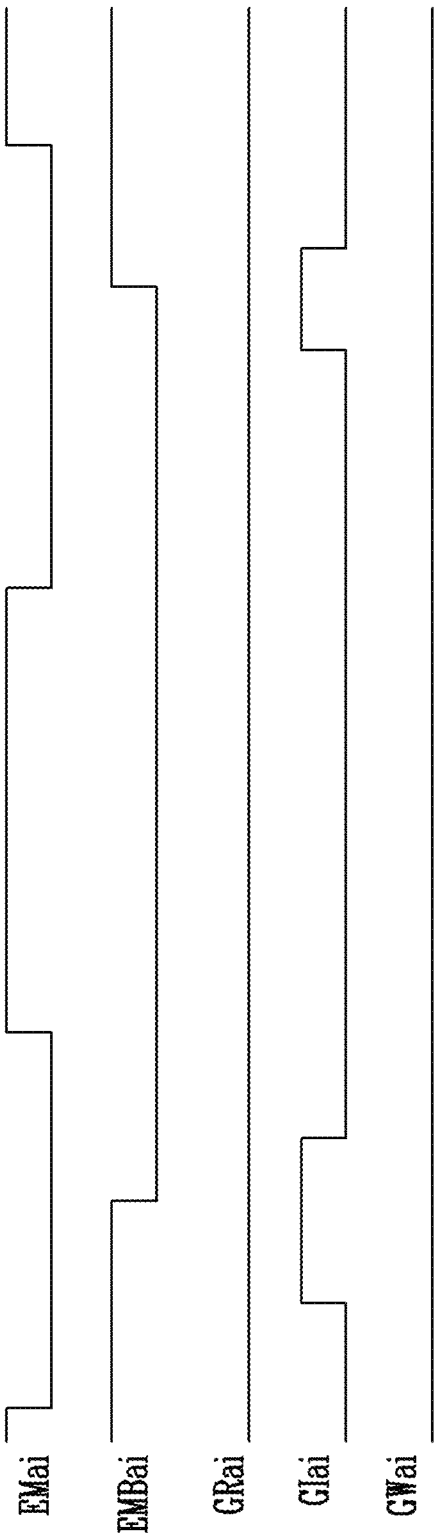
FIG. 20 is a timing diagram for a self-scan period according to an embodiment of the present disclosure.

FIG. 20 is a timing diagram illustrating a self-scan period according to an embodiment of the present disclosure.

The self-scan period in FIG. 20 may be an example of the self-scan period SS in FIGS. 3A and 3B. During the self-scan period of FIG. 20, signals with the same waveform as those of the address scan period of FIG. 19 may be applied to the first light emission line EMai, the second light emission line EMBai, and the second scan line GIai. However, scan signals at the turn-off level may be maintained in the first scan line GWai and the third scan line GRai. Accordingly, the first node N1*a* may be a floating state, and the voltage difference between both ends of the first capacitor Csta may be maintained. Accordingly, the luminance of the light emitting element LDa after the self-scan period of FIG. 20 may be the same as the luminance of the light emitting element LDa after the previous address scan period.

Figure 21:
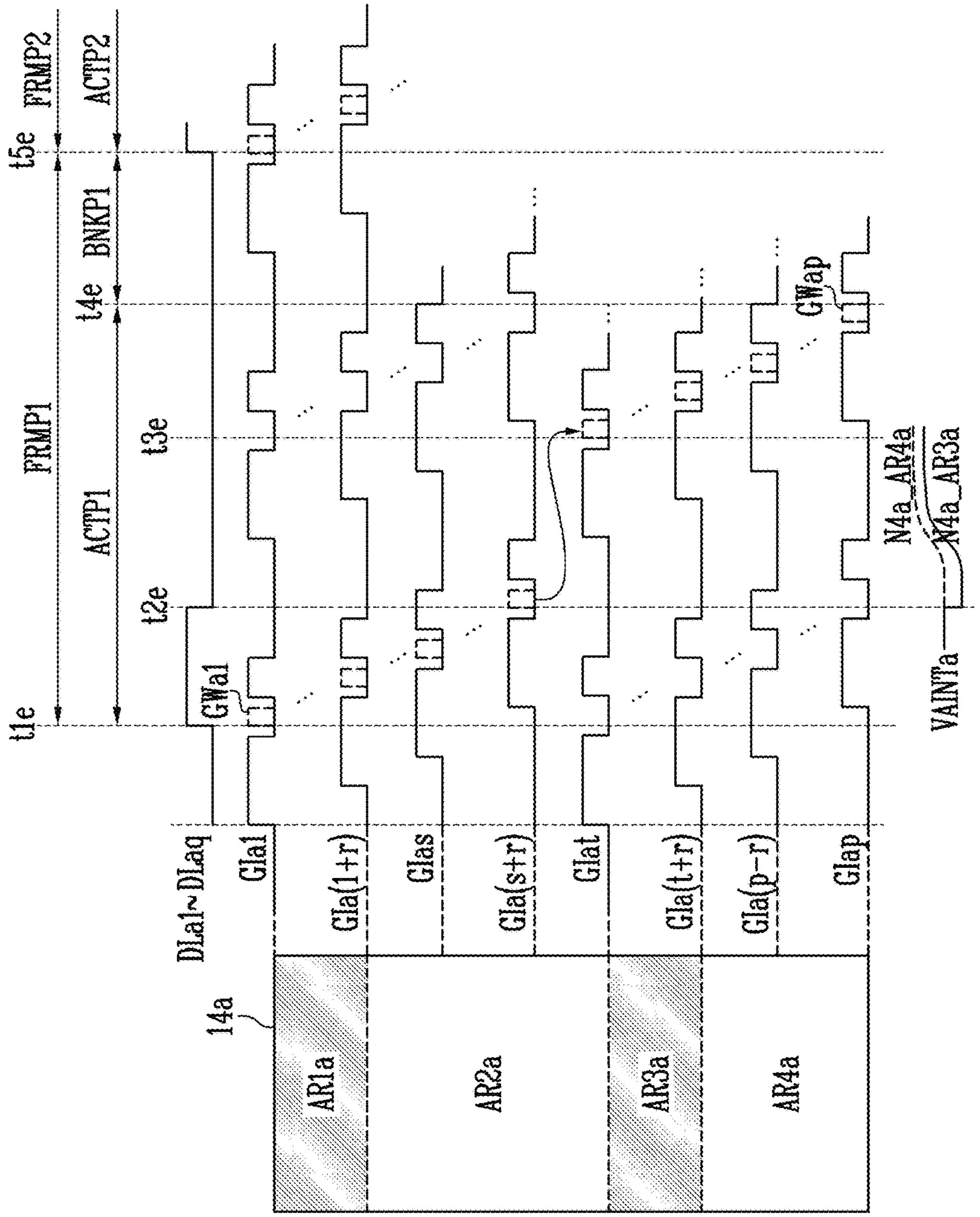
FIGS. 21 and 22 are timing diagrams for a display driving method according to other embodiments of the present disclosure.
Figure 22:
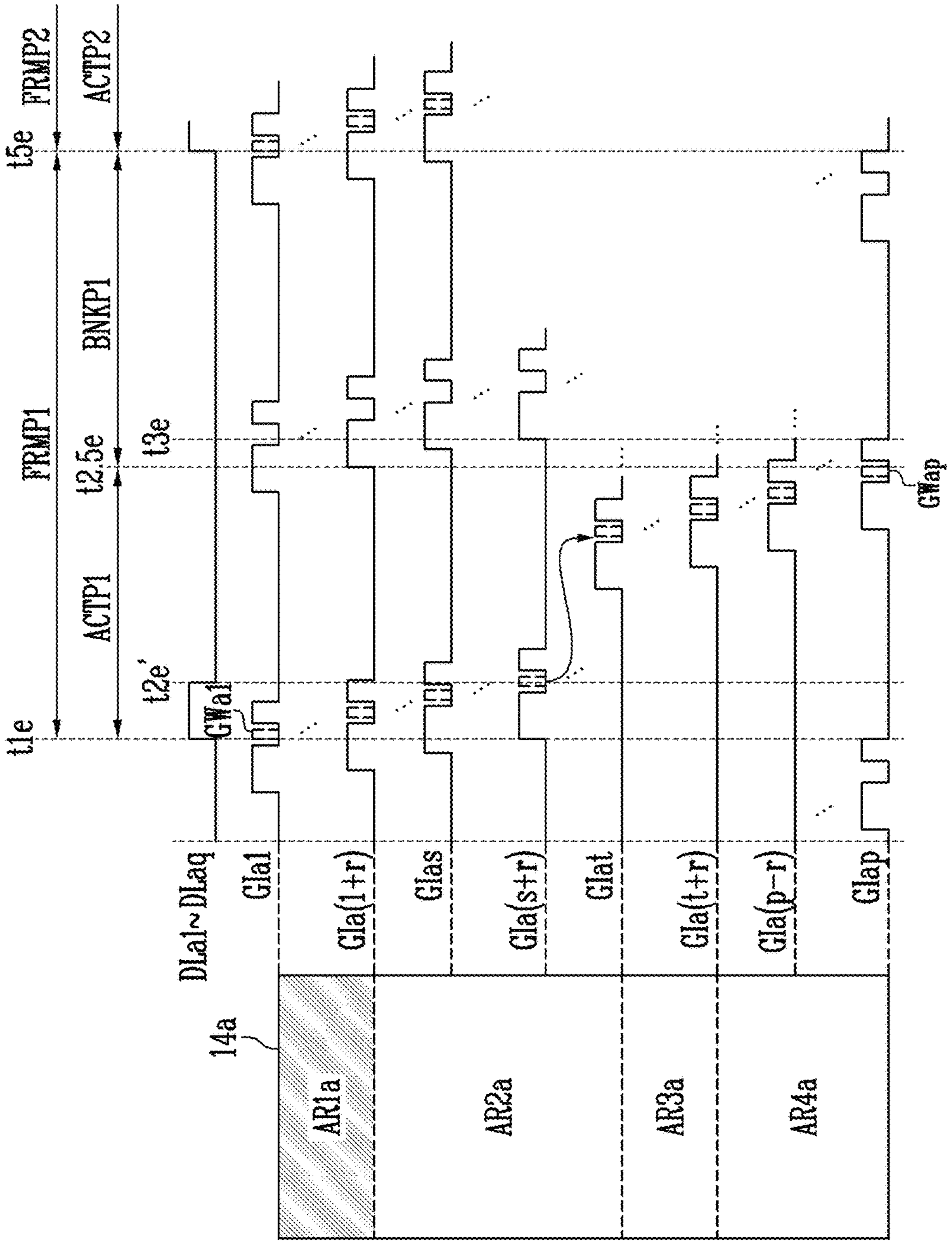

FIGS. 21 and 22 illustrate a driving method of a display device according to some other embodiments of the present disclosure.

Referring to FIGS. 21 and 22, each frame period FRMP1, FRMP2, . . . may include an active period and a blank period. For example, the first frame period FRMP1 may include an active period ACTP1 and a blank period BNKP1. The second frame period FRMP2 may include an active period ACTP2 and a blank period (not shown).

The active period ACTP1 or ACTP2 may be a period from a time when the pixels of the pixel unit 14*a* (see FIG. 17) receive an initial first scan signal GWa1 at the turn-on level to a time when the pixels of the pixel unit 14*a* receive a last first scan signal GWap at the turn-on level.

The first scan driver 13GWa may sequentially apply first scan signals at the turn-on level (e.g., high level) to the first scan lines GWa1 to GWap. For example, at the start of the active period ACTP1, the first scan driver 13GWa may apply the initial first scan signal at the turn-on level to the first scan line GWa1. During the active period ACTP1, the first scan driver 13GWa may apply the last first scan signal at the turn-on level to the first scan line GWap. During each active period ACTP1 or ACTP2, at the time corresponding to the first scan signals at the turn-on level, the data driver 12*a* may apply data voltages for all the pixels in one pixel row to the data lines DLa1 to DLaq.

The blank period BNKP1 may be a period from the time when the pixels of the pixel unit 14*a* receive the last first scan signal at the turn-on level to a time when they receive an initial first scan signal at the turn-on level of the next frame period FRMP2. During the blank period BNKP1, the data driver 12*a* may not apply data voltages to the lines DLa1 to DLaq. Depending on the embodiment, during the blank period BNKP1, the data driver 12*a* may maintain reference voltages at a specific level in the data lines DLa1 to DLaq, or the data driver 12*a* may not supply voltages to the data lines DLa1 to DLaq.

The second scan driver 13GBa may sequentially apply second scan signals at the turn-on level to the second scan lines GB1 to GBp. Here, each of the second scan signals at the turn-on level may include one or more pulses. For example, referring to FIG. 19, the first pulse of the second scan signal may occur at time t2*d*, and the second pulse of the second scan signal may occur at time t8*d*. In another example, the first pulse of the second scan signal may occur at the time t2*d* shown in FIG. 19, and the second pulse of the second scan signal may not occur at the time t8*d*. In this case, each of the second scan signals at the turn-on level may include one pulse. The waveform of the second scan signals in the self-scan period may be the same as the waveform of the second scan signals in the address scan period (see FIGS. 19 and 20).

Referring to the description of FIGS. 3A to 5, in the embodiments of FIGS. 21 and 22, one frame period FRMP1 may include one address scan period AS and one self-scan period SS for each pixel PXija. Address scan periods AS of pixels disposed in the same pixel row may be the same. Likewise, the self-scan periods SS of pixels disposed in the same pixel row may be the same. During the address scan period AS, each pixel may receive the first scan signal at the turn-on level and the second scan signal at the turn-on level. During the self-scan period SS, each pixel may not receive the first scan signal at the turn-on level but may receive the second scan signal at the turn-on level.

The pixel unit 14*a* may sequentially include a first area AR1*a*, a second area AR2*a*, a third area AR3*a*, and a fourth area AR4*a*. The first pixel row of the first area AR1*a* may be connected to the second scan line GIa1, and the last pixel row of the first area AR1*a* may be connected to the second scan line GIa(1+r), where r may be an integer greater than 0. One pixel row in the second area AR2*a* may be connected to the second scan line GIas, and the other pixel row in the second area AR2*a* is connected to the second scan line GIa(s+r), where s may be an integer greater than 1+r. One pixel row in the third area AR3*a* may be connected to the second scan line GIat, and the other pixel row in the third area AR3*a* may be connected to the second scan line GIa(t+r), where t may be an integer larger than s+r. One pixel row in the fourth area AR4*a* may be connected to the second scan line GIa(p−r), and another pixel row in the fourth area AR4*a* may be connected to the second scan line Giap, where p-r may be an integer larger than t+r.

The data voltages applied to the data lines DLa1 to DLaq for displaying portions of images in areas AR1*a*, AR2*a*, AR3*a*, and AR4*a* are applied at different times. For example, the data voltages corresponding to the first area AR1*a* during the first frame period FRMP1 are applied during the period from a time t1*e* to a time t2*e*. When the first frame period FRMP1 is defined as the period from the time t1*e* to the time t5*e*, the time t3*e* may be a middle time of the first frame period FRMP1. That is, the period t1*e* to t3*e* may correspond to half of the first frame period FRMP1. Additionally, the period t3*e* to t5*e* may correspond to half of the first frame period FRMP1.

In the embodiment of FIG. 21, a duration of the blank period BNKP1 may be less than half that of the corresponding first frame period FRMP1. That is, a duration of the active period ACTP1 may be longer than the duration of the blank period BNKP1. In this case, in the third area AR3*a*, the second scan signals at the turn-on level applied to the second scan lines GIat to GIa (t+r) may be applied before the time t2*e*. That is, the anode voltages of the light emitting elements LDa of the pixels connected to the second scan lines GIat to GIa (t+r) may be initialized as the initialization voltage VAINTa before the time t2*e*.

Depending on a layout of the pixel PXaij, the anode electrodes of the light emitting elements LDa may form parasitic capacitances with the adjacent data lines DLa1 to DLaq. Accordingly, if the data voltages vary at time t2*e*, the anode voltages N4*a*_AR3*a* of the light emitting elements LDa of the third area AR3*a* may vary depending on the data voltages. On the other hand, in the pixels of the fourth area AR4*a*, the anode voltages of the light emitting elements LDa may be initialized as the initialization voltage VAINTa after the time t2*e*. Accordingly, the anode voltages N4*a*_AR4*a* of the light emitting elements LDa of the fourth area AR4*a* are not affected by the variations in the data voltages at the time t2*e*.

Accordingly, in the embodiment of FIG. 21, even if a monochromatic image pattern is input to the third area AR3*a*, a copy image pattern for a specific image pattern in the first area AR1*a* may appear, e.g., as a ghost image.

In the embodiment of FIG. 22, the length of the blank period BNKP1 may be greater than or equal to half of the corresponding first frame period FRMP1. Referring to FIG. 22, an example is shown where the length of the blank period BNKP1 is greater than half of the corresponding first frame period FRMP1. In another embodiment, as described above, the first pulse of the second scan signal may occur at the time t2*d* shown in FIG. 19, and the second pulse of the second scan signal may not occur at the time t8*d*. In this embodiment, the length of the blank period BNKP1 may be equal to half of the corresponding first frame period FRMP1. That is, the end time of the first scan signal at the turn-on level of the first scan line GWap may be time t3*e*.

In the embodiment of FIG. 22, the second scan signal at the turn-on level that pixels (i.e., pixels connected to the first scan line GWap and the second scan line GIap) in the last pixel row among the pixels receive during the self-scan period, may not overlap the first scan signal at the turn-on level that pixels (i.e., pixels connected to the first scan line GWa1 and the second scan line GIa1) in the first pixel row among the pixels receive during the address scan period. For example, the second scan signal at the turn-on level that the pixels (i.e., pixels connected to the first scan line GWap and the second scan line GIap) in the last pixel row among the pixels receive during the self-scan period, may end before time t1*e*. At this time, the first scan signal at the turn-on level that the pixels (i.e., the pixels connected to the first scan line GWa1 and the second scan line GIa1) in the first pixel row among the pixels receive during the address scan period, may be received after time t1*e*. Even though the data voltages are rising at time t1*e* and falling at time t2*e*, the rising and falling are canceled out, so the ghost image pattern that may result from as shown in FIG. 21 does not appear in the third area AR3*a* when the operation of FIG. 22 is employed.

Figure 23:
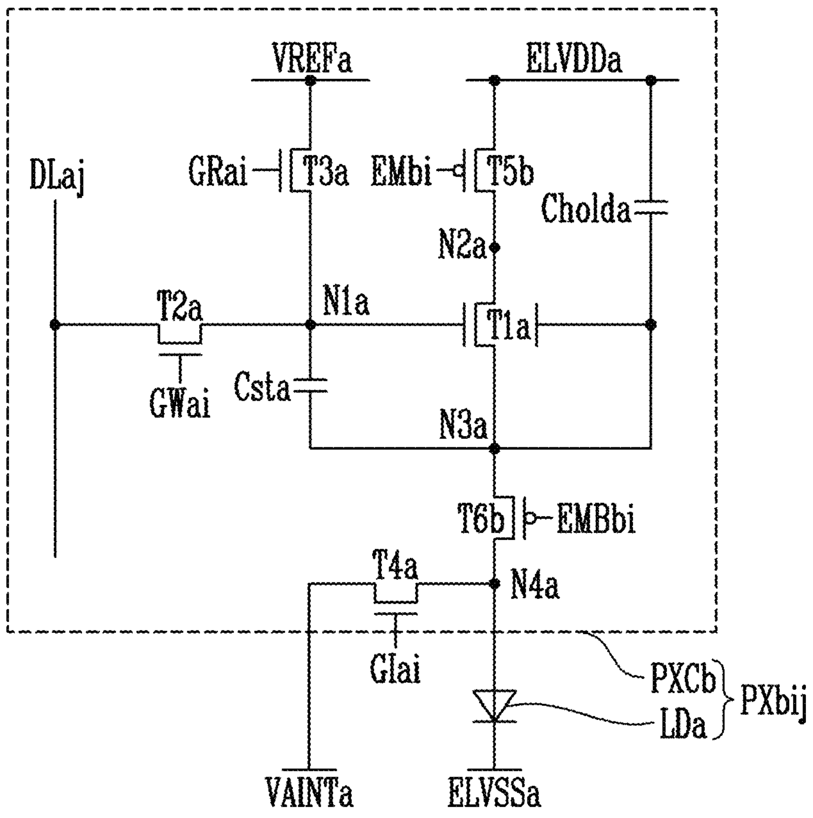
FIG. 23 is a circuit diagram of a pixel according to an embodiment of the present disclosure.

FIG. 23 is a circuit diagram for a pixel according to another embodiment of the present disclosure.

The pixel PXbij in FIG. 23 may have a pixel circuit PXCb is similar to the pixel circuit PXCa of the pixel PXaij shown in FIG. 18. The pixel circuit PXCb differs from the pixel circuit PXCa in that the fifth transistor T5*b* and sixth transistor T6*b* in the pixel circuit PXCb are P-type transistors. In this case, the embodiments of FIGS. 17 to 22 may be equally applied if polarities of the light emission signals applied to the first light emission line EMbi and the second light emission line EMBbi are reversed.

The drawings and the description of the present disclosure are intended to be illustrative. Therefore, it will be understood by those skilled in the art that various modifications and equivalent other embodiments are possible. Hence, the protective scope of the present document shall be determined by the technical scope of the accompanying claims.

What is claimed is:

1. A display device comprising:

pixels including light emitting elements that emit light with luminance based on received data voltages;

a first scan driver that provides first scan signals at a turn-on level that determines times at which the pixels receive the data voltages; and a second scan driver that provides second scan signals at a turn-on level that determines times for initializing anode voltages of the light emitting elements, wherein each frame period includes an active period and a blank period, the active period is a period from a time when the pixels receive an initial first scan signal at the turn-on level to a time when the pixels receive a last first scan signal at the turn-on level, the blank period is a period from the time when the pixels receive the last first scan signal at the turn-on level to a time when the pixels receive an initial first scan signal at the turn-on level of a next frame period, and a length of the blank period is larger than or equal to a cycle in which each of the pixels receives the second scan signals at the turn-on level.

2. The display device of claim 1, wherein:

the length of the blank period is an integer times of the cycle in which each of the pixels receives the second scan signals at the turn-on level.

3. The display device of claim 1, wherein each of the pixels receives the first scan signals at the turn-on level one time during one frame period, each of the pixels receives the second scan signals at the turn-on level N times during the one frame period, and the N is an integer greater than 3.

4. The display device of claim 3, wherein the length of the blank period is (N−3) times of the cycle in which each of the pixels receives the second scan signals at the turn-on level.

5. The display device of claim 4, wherein the N is 4, and the length of the blank period is one time of the cycle in which each of the pixels receives the second scan signals at the turn-on level.

6. The display device of claim 4, wherein the N is 5, and the length of the blank period is two times the cycle in which each of the pixels receives the second scan signals at the turn-on level.

7. The display device of claim 1, wherein
a number of pixels that simultaneously receive the second scan signals at the turn-on level remains the same throughout the frame periods.

8. A display device comprising:
pixels including light emitting elements that emit light with luminance based on received data voltages;
a first scan driver that provides first scan signals at a turn-on level that determines times at which the pixels receive the data voltages; and
a second scan driver that provides second scan signals at a turn-on level that determines times for initializing anode voltages of the light emitting elements, wherein
each frame period includes an active period and a blank period,
the active period is a period from a time when the pixels receive an initial first scan signal at the turn-on level to a time when the pixels receive a last first scan signal of the turn-on level,
the blank period is a period from the time when the pixels receive the last first scan signal at the turn-on level to a time when the pixels receive an initial first scan signal of the turn-on level of a next frame period, and
a length of the blank period is larger than or equal to half a corresponding frame period.

9. The display device of claim 8, wherein
each of the frame periods includes, for each of the pixels, one address scan period and one self-scan period,
during the address scan period, each of the pixels receives a first scan signal at the turn-on level and a second scan signal at the turn-on level, and
during the self-scan period, each of the pixels does not receive a first scan signal at the turn-on level and receives a second scan signal at the turn-on level.

10. The display device of claim 9, wherein
a second scan signal at the turn-on level that pixels in a last pixel row among the pixels receive during the self-scan period does not overlap a first scan signal at the turn-on level that pixels in a first pixel row among the pixels receive during the address scan period.

11. A display device comprising:
pixels including light emitting elements that emit light with luminance based on received data voltages;
a first scan driver that provides first scan signals at a turn-on level that determines times at which the pixels receive the data voltages; and
a second scan driver that provides second scan signals at a turn-on level that determines times for initializing anode voltages of the light emitting elements, wherein
each frame period includes, for each of the pixels, an address scan period and a self-scan period,
during the address scan period, each of the pixels receives a first scan signal at the turn-on level and a second scan signal at the turn-on level, and
during the self-scan period, each of the pixels does not receive a first scan signal at the turn-on level, and receives a second scan signal at the turn-on level,
during each of the frame periods, the self-scan period of a first pixel row starts before the address scan period of a last pixel row ends, and
during each of the frame periods, the second scan signals at the turn-on level supplied during the address scan periods of the pixels do not overlap the second scan signals at the turn-on level supplied during the self-scan periods of the pixels.

12. The display device of claim 11, wherein
during each of the frame periods, the second scan signals at the turn-on level supplied during the address scan periods of the pixels overlap each other in units of M adjacent pixel rows, and
M is an integer greater than 1.

13. The display device of claim 12, wherein
during each of the frame periods, the second scan signals at the turn-on level supplied during self-scan periods of the pixels overlap each other in units of the M adjacent pixel rows.

14. The display device of claim 13, wherein
a width of the second scan signals at the turn-on level is P horizontal periods,
the P is an integer greater than 0, and
the M is 2*P.

15. The display device of claim 14, wherein
the P is 4, and
the M is 8.

16. The display device of claim 14, wherein
the P is 3, and
the M is 6.

17. The display device of claim 14, wherein
the P is 2, and
the Mis 4.

18. The display device of claim 11, wherein
during each of the frame periods, each of the second scan signals at the turn-on level supplied during the address scan periods of the pixels includes Q pulses,
a first pulse among the Q pulses supplied to the first pixel row overlaps R pulses supplied to other pixel rows, and
each of Q and R is an integer greater than 0.

19. The display device of claim 18, wherein
a second pulse among the Q pulses supplied to the first pixel row overlaps S pulses supplied to other pixel rows, and
the Sis R+(R+1).

20. The display device of claim 19, wherein
a third pulse among the Q pulses supplied to the first pixel row overlaps T pulses supplied to other pixel rows, and
the Tis S+(R+1).

* * * * *